(12) United States Patent
Kaneda

(10) Patent No.: US 12,386,572 B2
(45) Date of Patent: Aug. 12, 2025

(54) IMAGE FORMING APPARATUS, AND CONTROL METHOD FOR CONTROLLING IMAGE FORMING APPARATUS

(71) Applicant: CANON KABUSHIKI KAISHA, Tokyo (JP)

(72) Inventor: Takeshi Kaneda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 18/050,752

(22) Filed: Oct. 28, 2022

(65) Prior Publication Data

US 2023/0082502 A1   Mar. 16, 2023

Related U.S. Application Data

(63) Continuation of application No. PCT/JP2021/013288, filed on Mar. 29, 2021.

(30) Foreign Application Priority Data

Apr. 30, 2020   (JP) ................................ 2020-080775

(51) Int. Cl.
*G06F 3/12* (2006.01)
(52) U.S. Cl.
CPC .......... *G06F 3/1257* (2013.01); *G06F 3/1204* (2013.01); *G06F 3/1287* (2013.01)
(58) Field of Classification Search
None
See application file for complete search history.

(56) References Cited

U.S. PATENT DOCUMENTS

2011/0235085 A1     9/2011  Jazayeri et al.
2015/0172483 A1*    6/2015  Kishida ................. G06F 3/1255
                                                       358/1.13
2017/0068494 A1*    3/2017  Fukuda ................. G06F 3/1273

FOREIGN PATENT DOCUMENTS

| CN | 102122261 A | 7/2011 |
| CN | 106055283 A | 10/2016 |
| JP | 2008152545 A | 7/2008 |
| JP | 2010160579 A | 7/2010 |
| JP | 2019006099 A | 1/2019 |
| JP | 2020004159 A | 1/2020 |
| JP | 2020004254 A | 1/2020 |

* cited by examiner

*Primary Examiner* — Frantz Bataille
(74) *Attorney, Agent, or Firm* — Canon U.S.A., Inc. IP Division

(57) ABSTRACT

An image forming apparatus includes a registration unit configured to register setting values of a plurality of setting items including a predetermined setting item and a identifier in association with each other, a transmission unit configured to transmit the identifier to an information processing apparatus, a reception unit configured to receive print data from the information processing apparatus and a control unit configured to execute processing based on the print data, wherein the information processing apparatus displays a print setting screen where the identifier can be selected and where the setting value of the predetermined setting item cannot be set, and based on selection of the identifier, the information processing apparatus displays a print setting screen where the setting value of the predetermined setting item can be set, and wherein the transmission unit transmits information indicating a setting value that can be set for the predetermined setting item.

13 Claims, 16 Drawing Sheets

FIG.6

| Select | Item Name | Change Settings | Change by job |
|---|---|---|---|
| ☐ | Number of Copies | 1 (1 – 9999) | ☐ |
| ☐ | 2-Sided Printing | ▼OFF | ☐ |
| ☐ | Staple | ▼OFF | ☐ |
|  | Staple Position | ▼TopLeft | ☐ |
| ☐ | Punch | ▼OFF | ☐ |
|  | Punch Position | ▼Left | ☐ |
| ☐ | Booklet | ▼OFF | ☐ |
|  | Opening Style | ▼Left Opening | ☐ |
|  | Creep Correction | 0.0  0.0 – 10.0 | ☐ |
| ☐ | Store | ▼OFF | ☐ |
|  | Box Number | 1  1 – 100 | ☐ |
| ☐ | Toner Save | ▼OFF | ☐ |

Add Presets/Finishing-Template    [Add] [Delete]

Name: _____

Type:  ☐ IPP Preset    ☐ Finishing Template

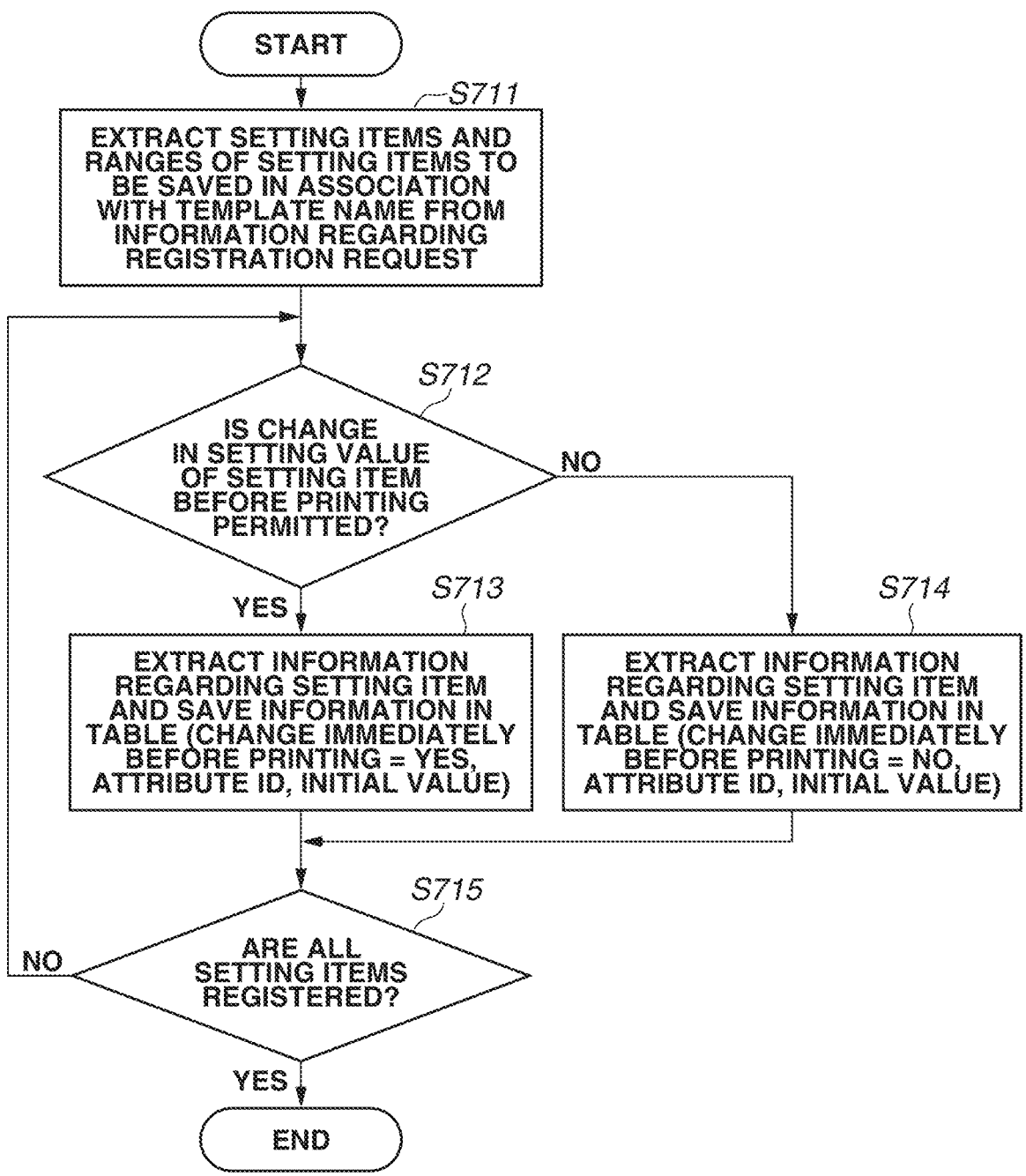

FIG.8A
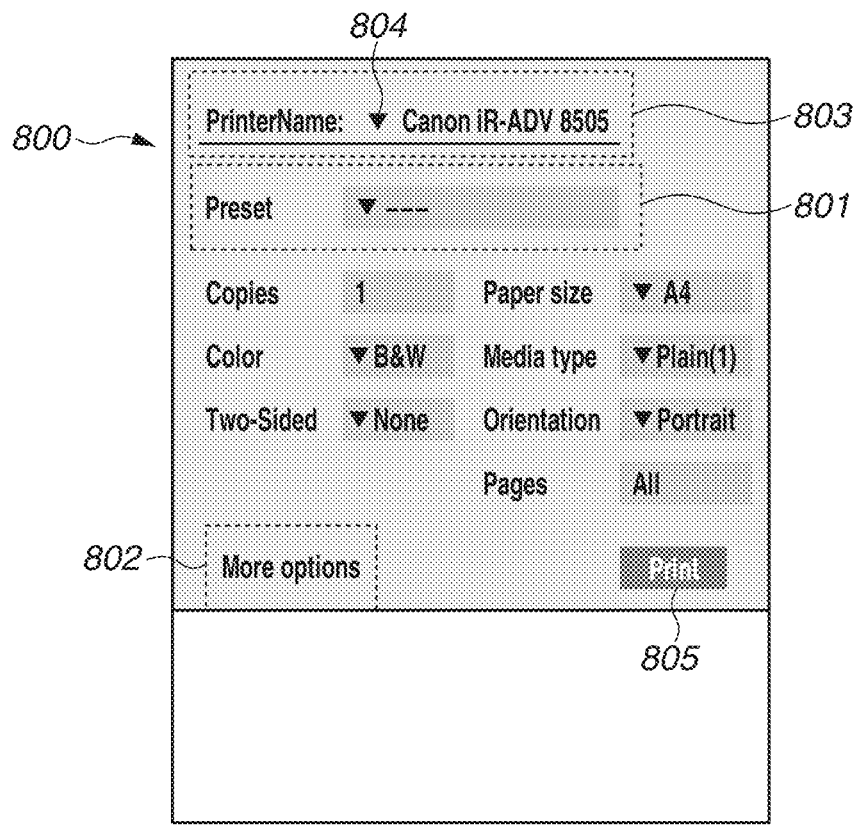
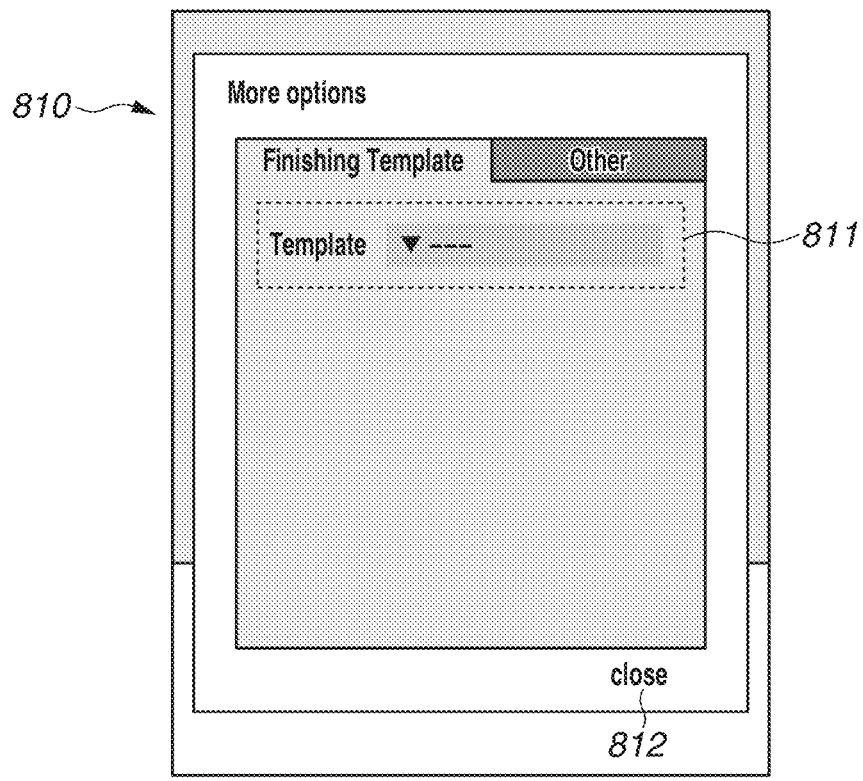

FIG.8B
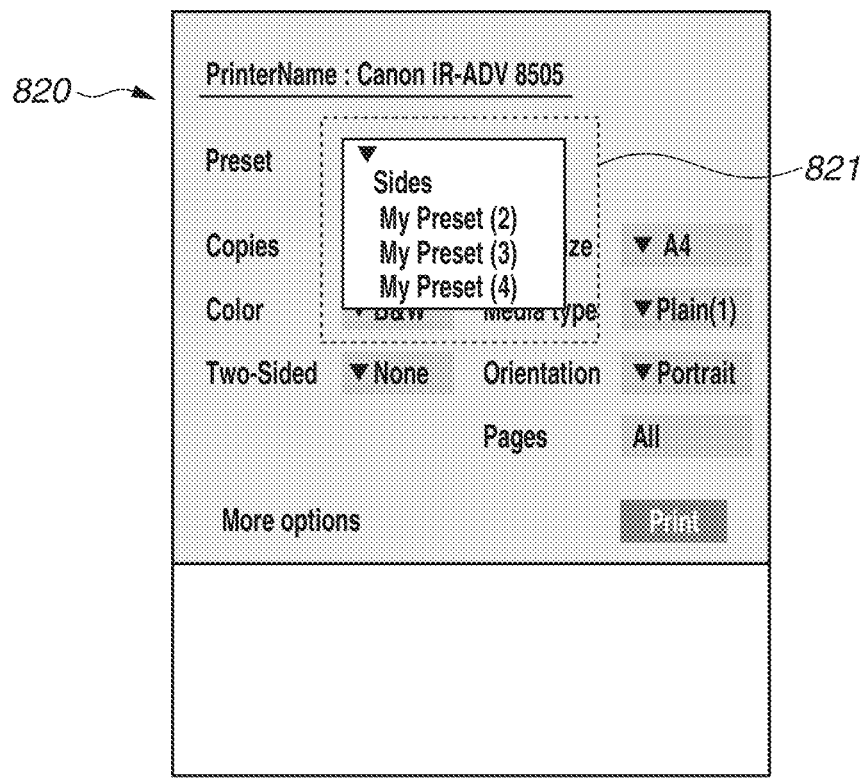
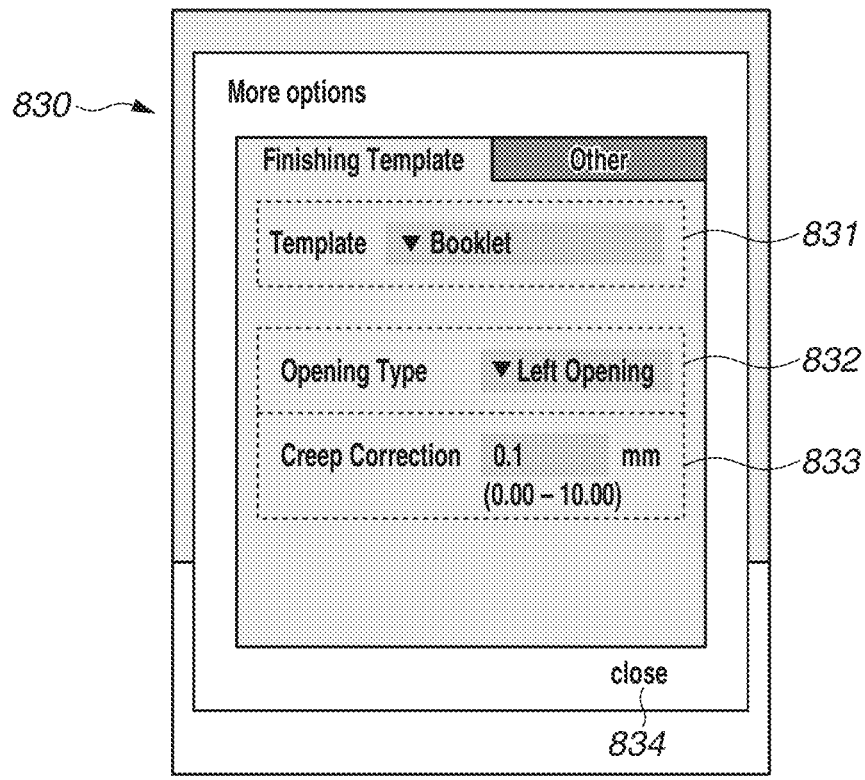

FIG.8C
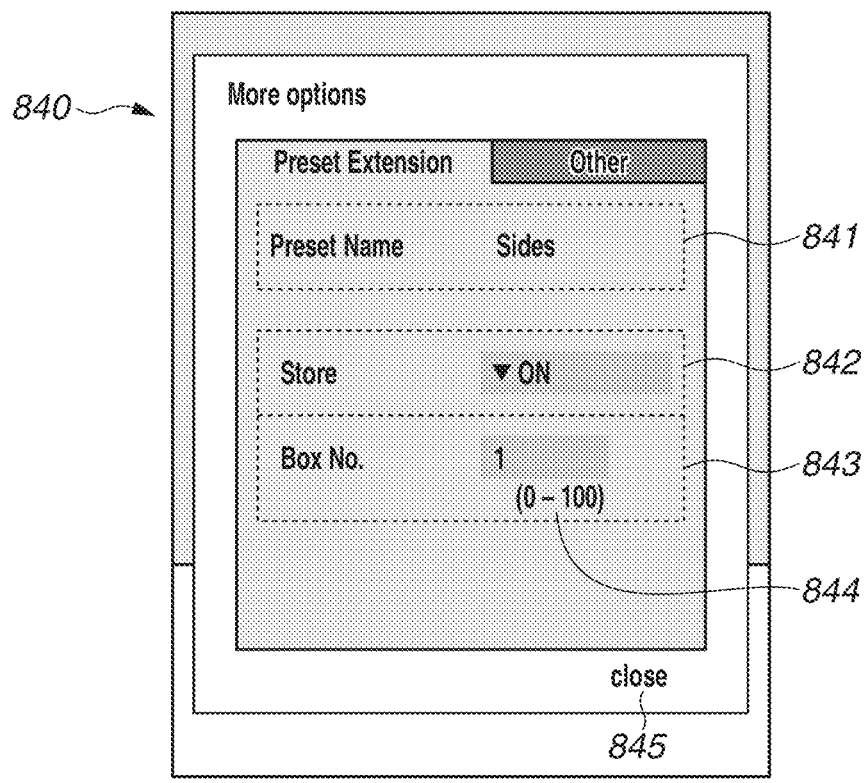
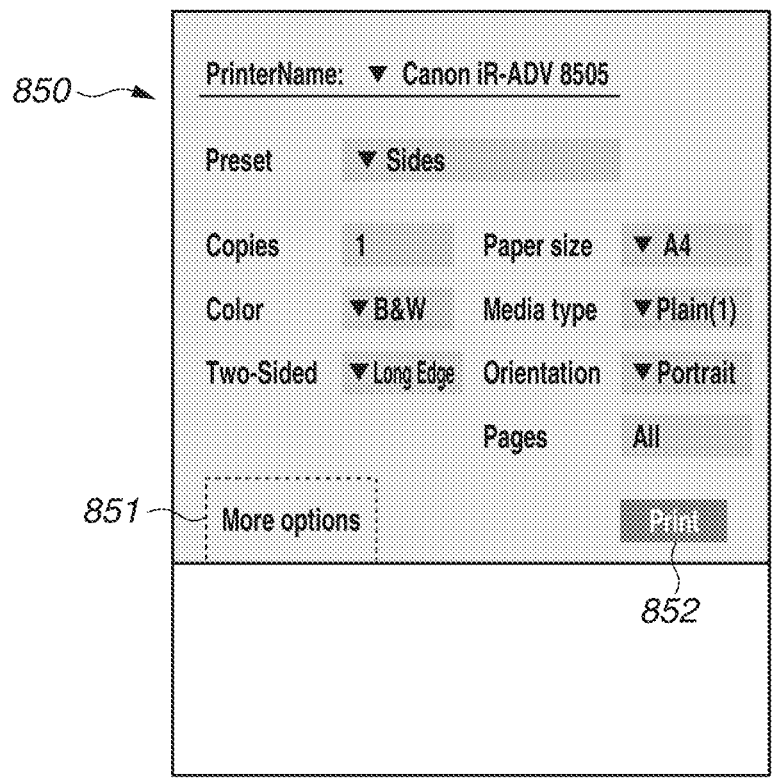

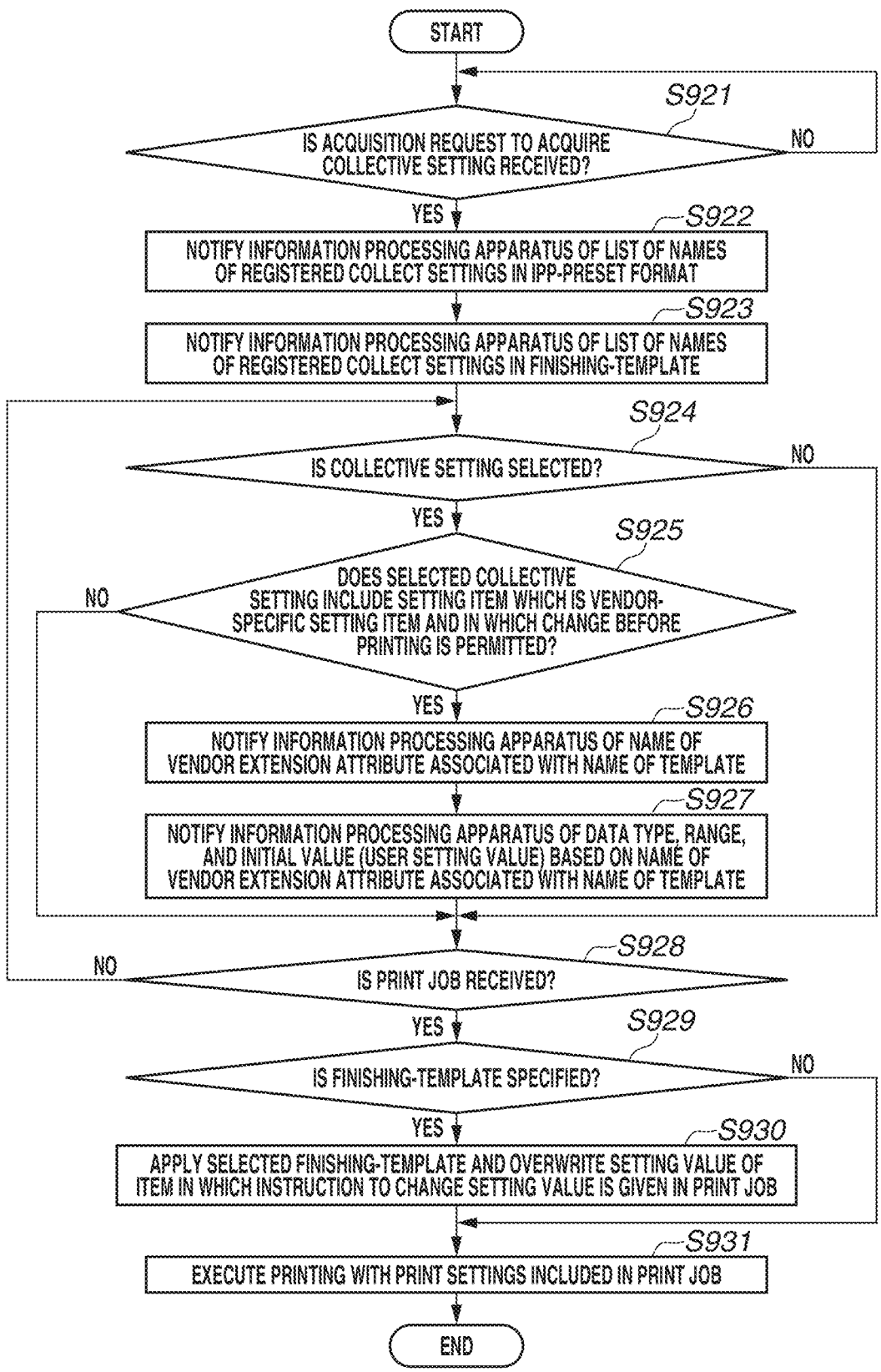

FIG.11A

USER MANAGEMENT TABLE (1110)

| USER ID (1111) | PASSWORD (1112) | USER NAME (1113) |
|---|---|---|
| 1 | pass-kaneda-2020 | kaneda |
| 2 | pass-matsui-2020 | matsui |

COLLECTIVE SETTING MANAGEMENT TABLE (1120)

| REGISTERER ID (1121) | COLLECTIVE SETTING ID (1122) | TYPE (1124) | COLLECTIVE SETTING NAME (1123) | COLLECTIVE SETTING KEY (1125) |
|---|---|---|---|---|
| 1 | 1 | fin-template | Booklet | com.canon.oip.grpsetting001 |
| 1 | 2 | preset | Sides | com.canon.oip.grpsetting002 |
| 2 | 3 | fin-template | Sides | com.canon.oip.grpsetting003 |

COLLECTIVE ATTRIBUTE MASTER TABLE (1130)

| ATTRIBUTE ID (1131) | ATTRIBUTE KEY (1132) | EXTENSION ATTRIBUTE (1133) | DATA TYPE (1134) | RANGE (1135) |
|---|---|---|---|---|
| 50 | com.canon.oip.booklet | YES | Boolean | true, false |
| 51 | com.canon.oip.booklet-opening-type | YES | Type3 Keyword | left, right |
| 52 | com.canon.oip.booklet-creep-correction | YES | Integer | 0:10 |
| 20 | com.canon.oip.sides | NO | Type2 Keyword | one-sided, two-sided-long-edge, two-sided-shortedge |
| 53 | com.canon.oip.tonorsave | YES | Boolean | true, false |
| 54 | com.canon.oip.box | YES | Boolean | true, false |
| 55 | com.canon.oip.boxno | YES | Integer | 0:100 |

FIG.11B

COLLECTIVE ATTRIBUTE MANAGEMENT TABLE (1140)

| COLLECTIVE SETTING ID (1141) | ATTRIBUTE ID (1142) | CHANGE IMMEDIATELY BEFORE PRINTING (1143) | INITIAL VALUE (1144) |
|---|---|---|---|
| 1 | 50 | NO | TRUE |
| 1 | 51 | YES | left |
| 1 | 52 | YES | 2 |
| 1 | 20 | YES | two-sided-long-edge |
| 2 | 20 | YES | two-sided-short-edge |
| 2 | 53 | NO | TRUE |
| 2 | 54 | NO | TRUE |
| 2 | 55 | YES | 1 |
| 3 | 20 | NO | two-sided-long-edge |

MESSAGE CATALOG TABLE (1150)

| KEY | EN |
|---|---|
| com.canon.oip.booklet | booklet |
| com.canon.oip.booklet-opening-type | opening type |
| com.canon.oip.booklet-creep-correction | creep correction |
| com.canon.oip.sides | sides |
| com.canon.oip.tonorsave | tonorsave |
| com.canon.oip.box | Store |
| com.canon.oip.boxno | Box NO. |
| left | Left |
| right | Right |
| true | ON |
| false | OFF |
| com.canon.oip.grpsetting001 | Booklet |
| com.canon.oip.grpsetting002 | Sides |
| com.canon.oip.grpsetting003 | Sides |

IMAGE FORMING APPARATUS, AND CONTROL METHOD FOR CONTROLLING IMAGE FORMING APPARATUS

CROSS-REFERENCE TO RELATED APPLICATIONS

THIS APPLICATION IS A CONTINUATION OF INTERNATIONAL PATENT APPLICATION NO. PCT/JP2021/013288, FILED Mar. 29, 2021, WHICH CLAIMS THE BENEFIT OF JAPANESE PATENT APPLICATION NO. 2020-080775, FILED Apr. 30, 2020, BOTH OF WHICH ARE HEREBY INCORPORATED BY REFERENCE HEREIN IN THEIR ENTIRETY.

BACKGROUND OF THE INVENTION

Field of the Invention

The present invention relates to an image forming apparatus, and a control method for controlling an image forming apparatus.

Background Art

In recent years, there is the Internet Printing Protocol (IPP) as a standard print function included in each of a plurality of operating systems (OSs) forming an information processing apparatus. In the IPP, the information processing apparatus enables the selection of various print settings according to ability information of which the information processing apparatus is notified by an image forming apparatus on a print screen of the information processing apparatus.

A technique for registering the setting values of a plurality of setting items as a single set in an image forming apparatus and making print settings in an information processing apparatus using the set of the setting values registered in the image forming apparatus is discussed. In the publication of Japanese Patent Application Laid-Open No. 2019-006099, a user registers a plurality of setting items as a set in advance in an image forming apparatus. An information processing apparatus acquires information for identifying the set of the setting values registered in the image forming apparatus from the image forming apparatus and displays the information on a display unit of the information processing apparatus. The information processing apparatus displays the acquired identification information and receives the selection of identification information to be used in printing from the user. Then, the information processing apparatus transmits the selected identification information to the image forming apparatus.

CITATION LIST

Patent Literature

PTL 1: Japanese Patent Application Laid-Open No. 2019-006099

Incidentally, on a print setting screen provided by a print service compatible with the IPP, setting items that can be set by a user are limited to setting items defined by the IPP, and vendor-specific setting items or setting values of an image forming apparatus cannot be set. The vendor-specific setting items or setting values are, for example, setting items or setting values regarding the "opening direction" and the "amount of creep correction" when a bookbinding process is performed.

If a set of a plurality of setting items registered in the image forming apparatus includes the vendor-specific setting items or setting values, the vendor-specific setting items or setting values cannot be displayed or changed on the print setting screen provided by the print service compatible with the IPP.

SUMMARY OF THE INVENTION

The present invention relates to the above-described notification of the ability and the selection method. In order to solve the above-described issue, according to an aspect of the present invention, an image forming apparatus includes a registration unit configured to register setting values of a plurality of setting items including a predetermined setting item and a single identifier in association with each other, a transmission unit configured to transmit the identifier registered by the registration unit to an information processing apparatus, a reception unit configured to receive print data from the information processing apparatus having received the identifier transmitted from the transmission unit, and a control unit configured to execute processing based on the received print data, wherein the information processing apparatus displays a print setting screen where the identifier received from the image forming apparatus can be selected but is not selected and where the setting value of the predetermined setting item cannot be set, and based on selection of the identifier on the print setting screen, the information processing apparatus displays a print setting screen where the setting value of the predetermined setting item can be set, and wherein the transmission unit transmits information indicating a setting value that can be set for the predetermined setting item and can be set instead of the setting value of the predetermined setting item registered in association with the identifier.

Further features of the present invention will become apparent from the following description of exemplary embodiments with reference to the attached drawings.

BRIEF DESCRIPTION OF THE DRAWINGS

FIG. 6 is an example of a preset/template registration screen according to the present exemplary embodiment.

FIG. 7 is a flowchart illustrating a preset/template setting process according to the present exemplary embodiment.

FIGS. 8A to 8C are diagrams illustrating examples of print setting screens displayed on a touch panel of the information processing apparatus according to the present exemplary embodiment.

FIG. 9B is a flowchart illustrating the vendor extension attribute acquisition process according to the present exemplary embodiment.

FIGS. 11A and 11B are diagrams illustrating examples of data structures of tables stored in a preset/template database (DB) 416 according to the present exemplary embodiment.

DESCRIPTION OF THE EMBODIMENTS

In the present exemplary embodiment, a user registers a preset or a template with the setting values of a plurality of setting items as a single set in an image forming apparatus. An information processing apparatus acquires identification information regarding collective settings that are sets of the setting values of a plurality of setting items from the image forming apparatus and displays the identification information on a print setting screen. The user acquires identification information regarding a collective setting to be used in print settings from the print setting screen of the information processing apparatus. In the present exemplary embodiment, as a collective setting, a vendor-specific setting item or setting value can be set in addition to a setting item and a setting value defined by the Internet Printing Protocol (IPP).

The image forming apparatus identifies a setting item of which the setting needs to be changed before the execution of a job among setting items included in a single collective setting.

Then, the information processing apparatus is notified of a vendor-specific setting item or setting value of which the setting may be changed before the execution of the job among the setting items included in the collective setting, in association with identification information regarding the collective setting. In this manner, when the user selects a collective setting to be used in printing from collective settings in the image forming apparatus, and even if the selected collective setting includes a vendor-specific item, the information processing apparatus can change the print setting of the setting item before the execution of the job.

Figure 1:
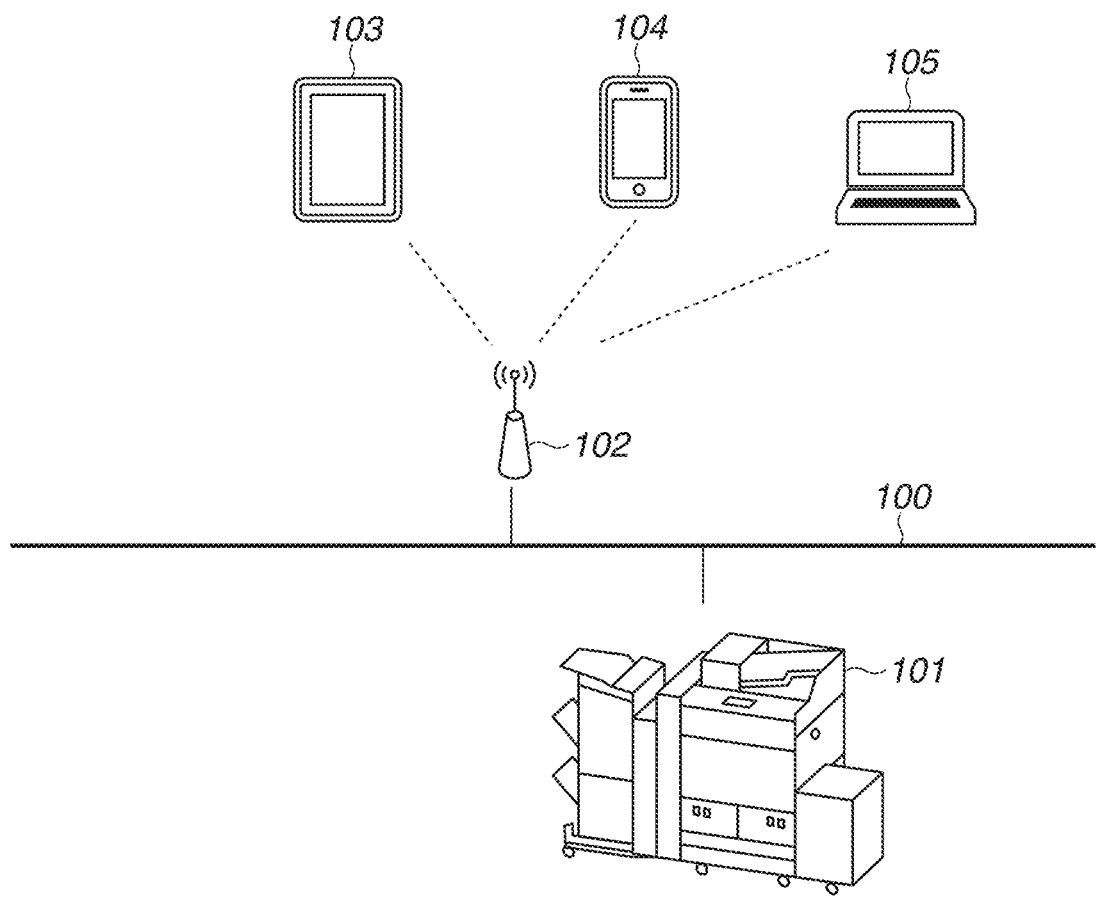
FIG. 1 is a diagram illustrating an example of a system configuration according to the present exemplary embodiment.

FIG. 1 is described. FIG. 1 is a diagram illustrating an example of the configuration of a printing system according to the present invention. An image forming apparatus 101 is connected to a local area network (LAN) 100. Information processing apparatuses 103, 104, and 105 are connected to the LAN 100 via an AP access point 102. The present exemplary embodiment is described using the information processing apparatuses 103, 104, and 105 such as a tablet, a smartphone, and a personal computer (PC) as examples of the information processing apparatus. In the following description, a tablet, a smartphone, and a PC will be collectively referred to as "information processing apparatuses". These information processing apparatuses can transmit print data to the image forming apparatus 101 via the LAN 100. The present exemplary embodiment is described using the above configuration example as an example of the printing system. The present invention, however, is not limited to this, and at least one or more information processing apparatuses and image forming apparatuses only need to be connected together via a network so that the at least one or more information processing apparatuses and image forming apparatuses can communicate with each other. The network may be a wireless or wired network.

Figure 2:
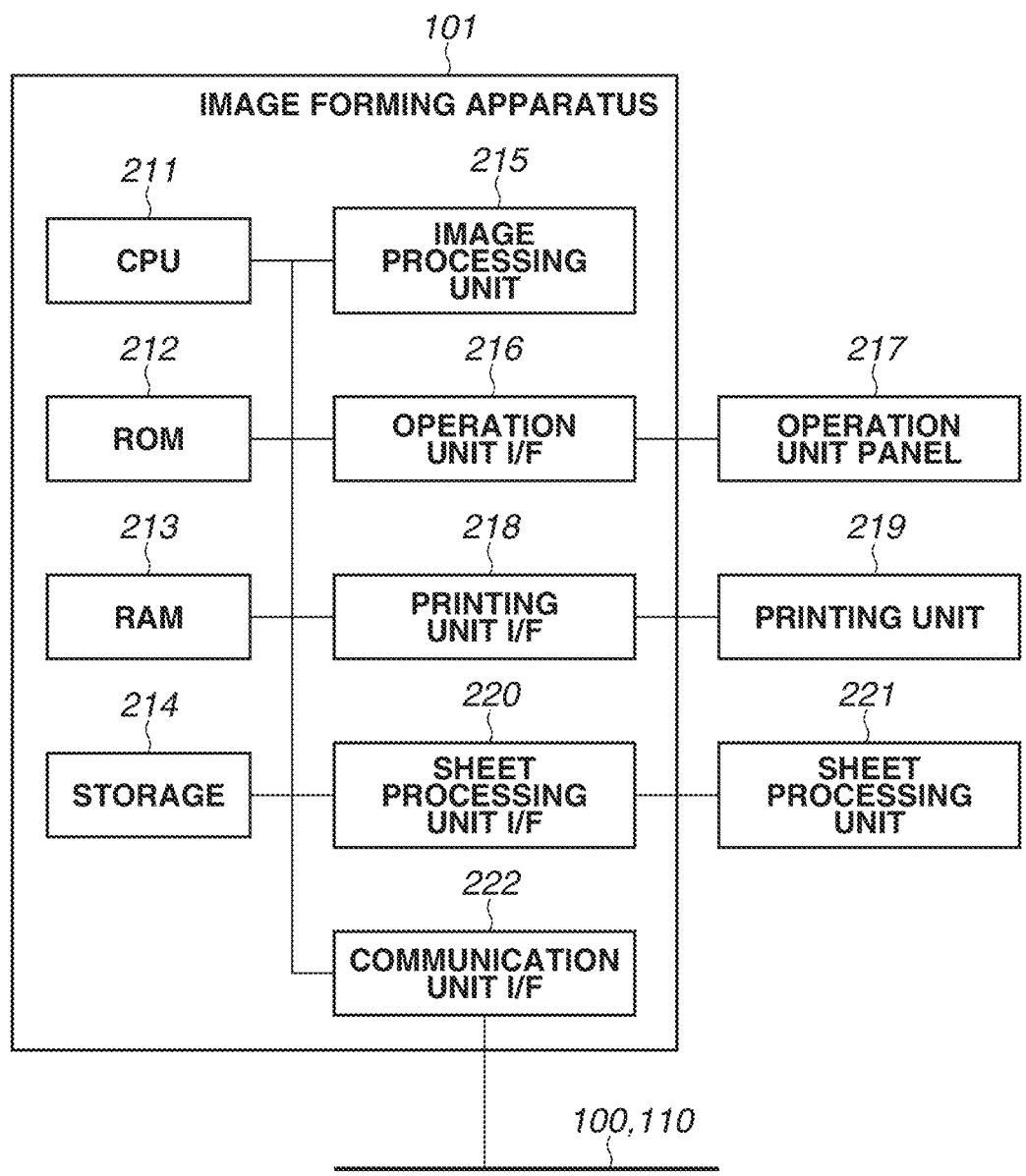
FIG. 2 is a diagram illustrating an example of a hardware configuration of an image forming apparatus according to the present exemplary embodiment.

FIG. 2 is a diagram illustrating an example of the hardware configuration of the image forming apparatus 101.

FIG. 2 is a block diagram illustrating the hardware configuration of the image forming apparatus 101 according to the present exemplary embodiment. The present exemplary embodiment is described using the image forming apparatus as an example. Alternatively, an image forming apparatus such as a multifunction peripheral (MFP) obtained by an image forming apparatus including a scanner function and a fax function may be used. A control unit including a central processing unit (CPU) 211 controls the operation of the entirety of the image forming apparatus 101. The CPU 211 loads programs stored in a read-only memory (ROM) 212 or storage 214 into a random-access memory (RAM) 213 and executes the programs, thereby performing various types of control such as print control and reading control. The ROM 212 stores a control program and a boot program that can be executed by the CPU 211. The RAM 213 is a main storage memory of the CPU 211 and is used as a work area or a temporary storage area into which various control programs are loaded. The storage 214 stores print data, image data, various programs, and various pieces of setting information. In the present exemplary embodiment, as the storage 214, an auxiliary storage device such as a hard disk drive (HDD) is used. Alternatively, a non-volatile memory such as a solid-state drive (SSD) may be used.

In the image forming apparatus 101 according to the present exemplary embodiment, a single CPU 211 executes processes illustrated in flowcharts described below, using a single RAM 213. Alternatively, another form may be employed. For example, a plurality of CPUs, RAMs, ROMs, and spaces of storage may cooperate to execute the processes illustrated in the flowcharts described below. Yet alternatively, some of the processes may be executed using a hardware circuit such as an application-specific integrated circuit (ASIC) or a field-programmable gate array (FPGA).

An operation unit interface (I/F) 216 connects an operation unit 217 and the control unit. The operation unit 217 includes a display unit having a touch panel function and various hardware keys, and functions as a display unit that displays information and a reception unit that receives an instruction from a user. A printing unit I/F 218 connects a printing unit 219 and the control unit. Image data generated by analyzing a print job received from each information processing apparatus is transferred from the control unit to the printing unit 219 via the printing unit I/F 218. The printing unit 219 receives via the control unit a control command and a print job that should be printed. Then, based on the print job, the printing unit 219 prints an image on a sheet fed from a sheet feeding cassette (not illustrated). The printing method of the printing unit 219 may be an electrophotographic method, or may be an inkjet method. Alternatively, another printing method such as a thermal transfer method can also be applied. The control unit is also connected to the LAN 100 via a communication unit I/F 222. The communication unit I/F 222 transmits information to the information processing apparatus 103, 104, or 105 and receives a print job and information from the information processing apparatus 103, 104, or 105 on the LAN 100.

An image processing unit 215 has the function of a raster image processor (RIP) that rasterizes a print job received from the information processing apparatus 103, 104, or 105, thereby generating print image data. The image processing unit 215 can also perform a resolution conversion process and a correction process on the image data obtained by rasterizing the print job. The present exemplary embodiment assumes that the image processing unit 215 is achieved by a hardware circuit such as an ASIC or an FPGA. The present invention, however, is not limited to this. Alternatively, for example, the image forming apparatus 101 may further include a processor for image processing, and the processor may execute an image processing program, thereby achieving image processing and a rasterization process on print data. In this case, the processor and the CPU 211 cooperate to achieve the flowcharts described below. Yet alternatively, a configuration can also be employed in which the CPU 211 executes a program for performing image processing, thereby performing image processing and a rasterization process on print data. Yet alternatively, image processing may be performed based on the combination of any of these methods.

A sheet processing unit I/F 220 connects the control unit and a sheet processing unit 221. The sheet processing unit 221 receives a control command from the control unit, and according to the control command, performs post-processing on a sheet on which an image is printed by the printing unit 219.

Figure 4:
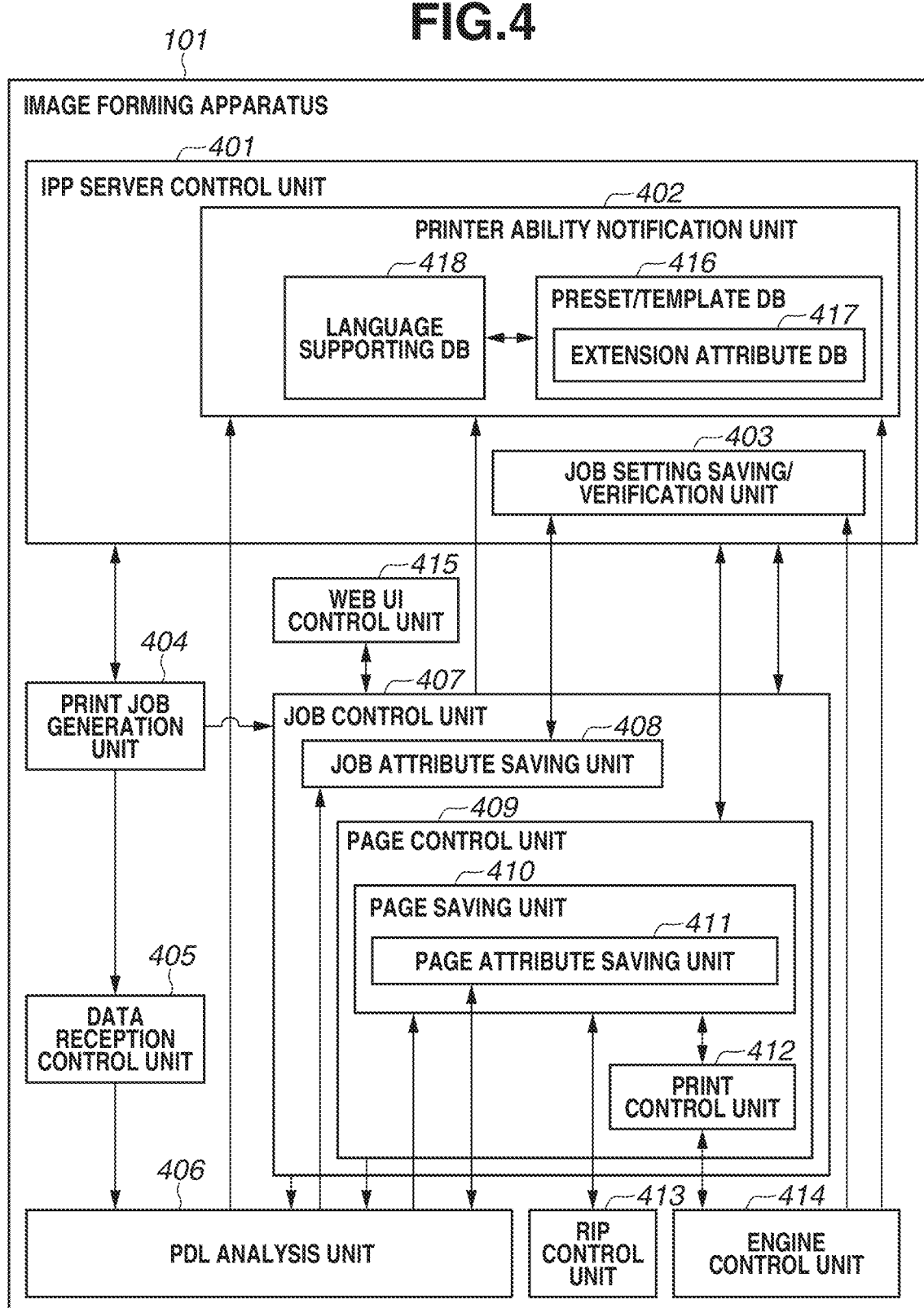
FIG. 4 is a diagram illustrating an example of a software configuration of the image forming apparatus according to the present exemplary embodiment.

FIG. 4 is a diagram illustrating an example of the software configuration of the image forming apparatus 101.

Functional blocks illustrated in FIG. 4 are achieved by the CPU 211 executing a program loaded into the RAM 213.

A web user interface (UI) control unit 415 has the function of registering and editing a collective setting for registering a plurality of print settings illustrated in FIG. 6 as a set and collectively applying the set. The user registers a plurality of print settings selected and set in advance as a single collective setting through a registration screen 600. The collective setting created through this web UI by the user is saved as a preset or a template in a preset/template database (DB) 416. The preset/template DB 416 includes an extension attribute DB 417 that holds the data types, the ranges, and the initial values as detailed information regarding vendor-specific extension attributes that are not defined by the IPP standard.

In the present exemplary embodiment, the preset or the template can include not only setting items defined by the IPP standard but also vendor-specific settings. For example, "Number of Copies" and "2-Sided Printing" are attributes defined by the IPP. On the other hand, "Booklet", "Store", and "Toner Save" are vendor-specific setting items. "Booklet" is a setting item regarding whether to perform bookbinding printing. If "Booklet" is set to ON, the opening direction and the correction value of the amount of creep of an output product can be set. "Store" is a setting for giving an instruction to save print data received by the image forming apparatus 101. If "Store" is set to ON, the user can set in which of boxes as saving folders included in the image forming apparatus 101 print data is to be saved. "Toner Save" is a setting regarding whether to perform printing by reducing the consumption amount of toner when printing is performed. "Toner Save" is switched between ON and OFF. Even a setting item defined by the IPP such as "Staple" or "Punch" may be a setting item for which a vendor-specific setting value should be set or a setting value that cannot be set in a predetermined print service provided by an operating system (OS) should be set. In the present exemplary embodiment, a setting item including a setting value that cannot be set in the predetermined print service as described above is treated as a vendor-specific setting item. For example, if "Staple" for binding an output is set to ON, a screen for setting which positions in a sheet are to be stapled in addition to the number of positions to be stapled is displayed. Also if "Punch" for making punched holes in the sheet is set to ON, a screen for setting how many punched holes are to be made and at which positions in the sheet the punched holes are to be made is displayed.

If the user includes vendor-specific setting items in the collective setting, each information processing apparatus is notified of these setting items related to vendor extension as ability information regarding the image forming apparatus in association with the name of the collective setting.

An IPP server control unit 401 includes a printer ability notification unit 402. The printer ability notification unit 402 receives an inquiry about the image forming apparatus from the information processing apparatus 103, 104, or 105 and notifies the information processing apparatus 103, 104, or 105 of the ability information regarding the printer. Specific examples of the ability information of which the information processing apparatus 103, 104, or 105 is notified include a list of the names of collective settings of print items held in the preset/template DB 416, and the data types, the ranges, and the initial values as detailed information regarding vendor extension attributes included in the collective settings. Regarding the names of the collective settings and the names of the vendor extension attributes, a language supporting DB 418 provides UI display character strings in a Message-Catalog format.

The information processing apparatus 103, 104, or 105 acquires the ability of the printer, then generates a print job according to the printer, and transmits the print job to the image forming apparatus. The IPP server control unit 401 performs the process of receiving print data from the information processing apparatus.

If the image forming apparatus receives an IPP print job from the information processing apparatus 103, 104, or 105, the image forming apparatus generates a new job in a job control unit 407 via a print job generation unit 404. Next, a job setting saving/verification unit 403 verifies a job attribute specified as an IPP attribute and writes the job attribute to a job attribute saving unit 408. If a collective setting having print attributes in a Finishing-Template format is assigned to a job, the image forming apparatus inquires of the preset/template DB 416 about an attribute that should be applied, and reflects the attribute on print settings. If an individual print attribute is set in addition to the collective setting, the collective setting is overwritten. The details of attributes that can be collectively set will be described with reference to FIG. 6.

The IPP server control unit 401 transfers drawing data on job data to a data reception control unit 405 in parallel with the attribute process and temporarily saves the drawing data in the data reception control unit 405. The data reception control unit 405 is a buffer area for a print job received by the print job generation unit 404 and saves each print job in the storage 214.

A page description language (PDL) analysis unit 406 included in the image forming apparatus 101 according to the present exemplary embodiment is compatible with Portable Document Format (PDF) and the Printer Working Group (PWG) Raster format. The PDL analysis unit 406 receives an instruction from the job control unit 407, requests print drawing data from the data reception control unit 405, and performs an analysis process. Regarding page data generated by the PDL analysis unit 406, a page control unit 409 saves image data in a page saving unit 410 and saves page attribute information in a page attribute saving unit 411.

The page control unit 409 controls a page analysis process of the PDL analysis unit 406, a RIP process of a RIP control unit 413, and a print control process of a print control unit 412. The print control unit 412 acquires RIP-processed image data from the page saving unit 410, performs color separation on the image data into red, green, and blue (RGB), and transfers the pieces of image data to an engine control unit 414. The engine control unit 414 receives the pieces of image data corresponding to RGB in page units from the print control unit 412 and controls the print control unit 412 to perform a printing process on each page. The web UI control unit 415 acquires information regarding the state of a print job that is being processed from the job control unit 407, and displays the processing state of the print job on a UI screen.

Figure 3:
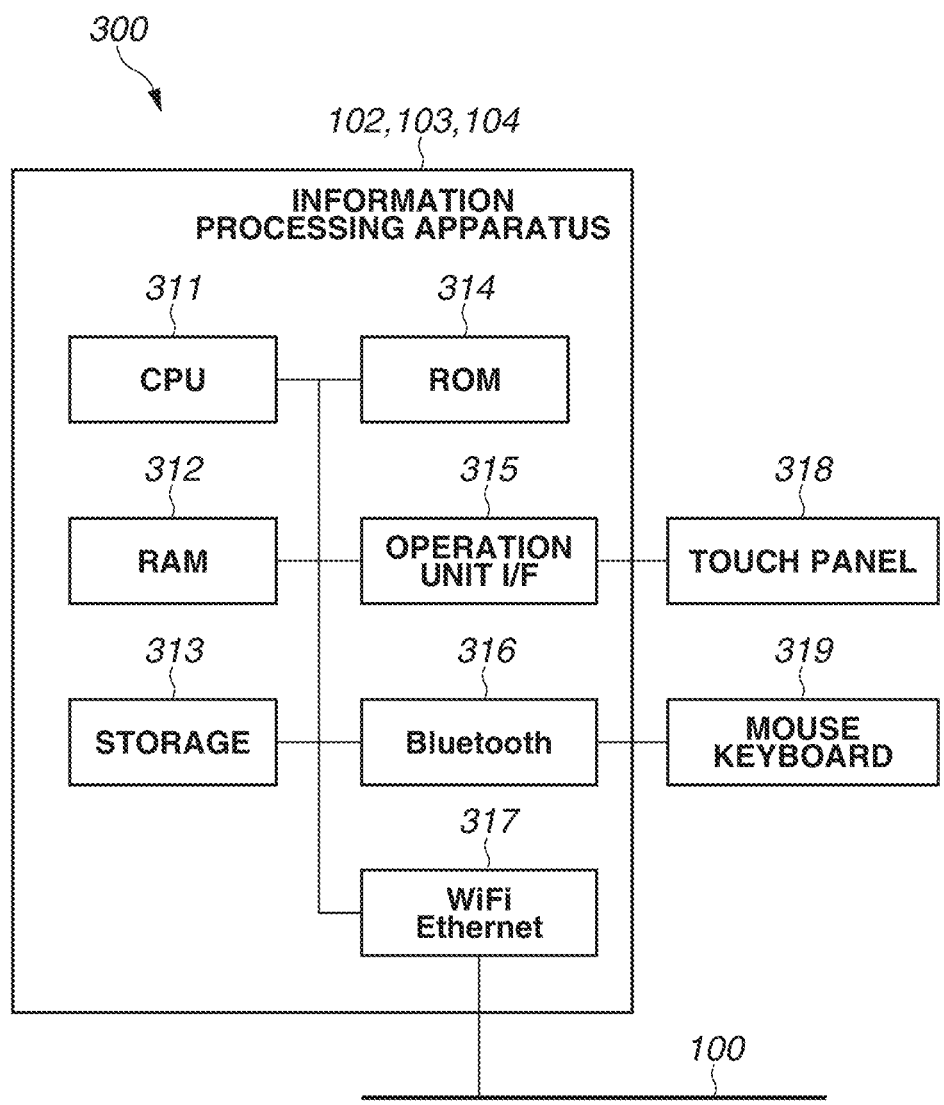
FIG. 3 is a diagram illustrating an example of a hardware configuration of an information processing apparatus according to the present exemplary embodiment.

FIG. 3 is a diagram illustrating an example of the hardware configuration of each of the information processing apparatuses 103, 104, and 105.

A control unit 300 including a CPU 311 controls the operation of the entirety of each of the information processing apparatuses. The CPU 311 loads programs stored in a ROM 314 or storage 313 into a RAM 312 and executes the programs, thereby performing various types of control such as control of a print setting screen, the generation of print data, and the transfer of a print job. The ROM 314 stores a control program and a boot program that can be executed by the CPU 311. The RAM 312 is a main storage memory of the CPU 311 and is used as a work area or a temporary storage area into which various programs are loaded. The storage 313 stores an OS, a print application, an OS print framework, a print job generated by the OS print framework, and various pieces of setting information. In the present exemplary embodiment, as the storage 313, an auxiliary storage device such as an HDD is used. Alternatively, a non-volatile memory such as an SSD may be used. A touch panel 318 is connected to an operation unit I/F 315. The touch panel 318 not only draws screens for applications and the print setting screen, but also notifies an application operating on the CPU 311 of a touch operation of the user.

Figure 5:
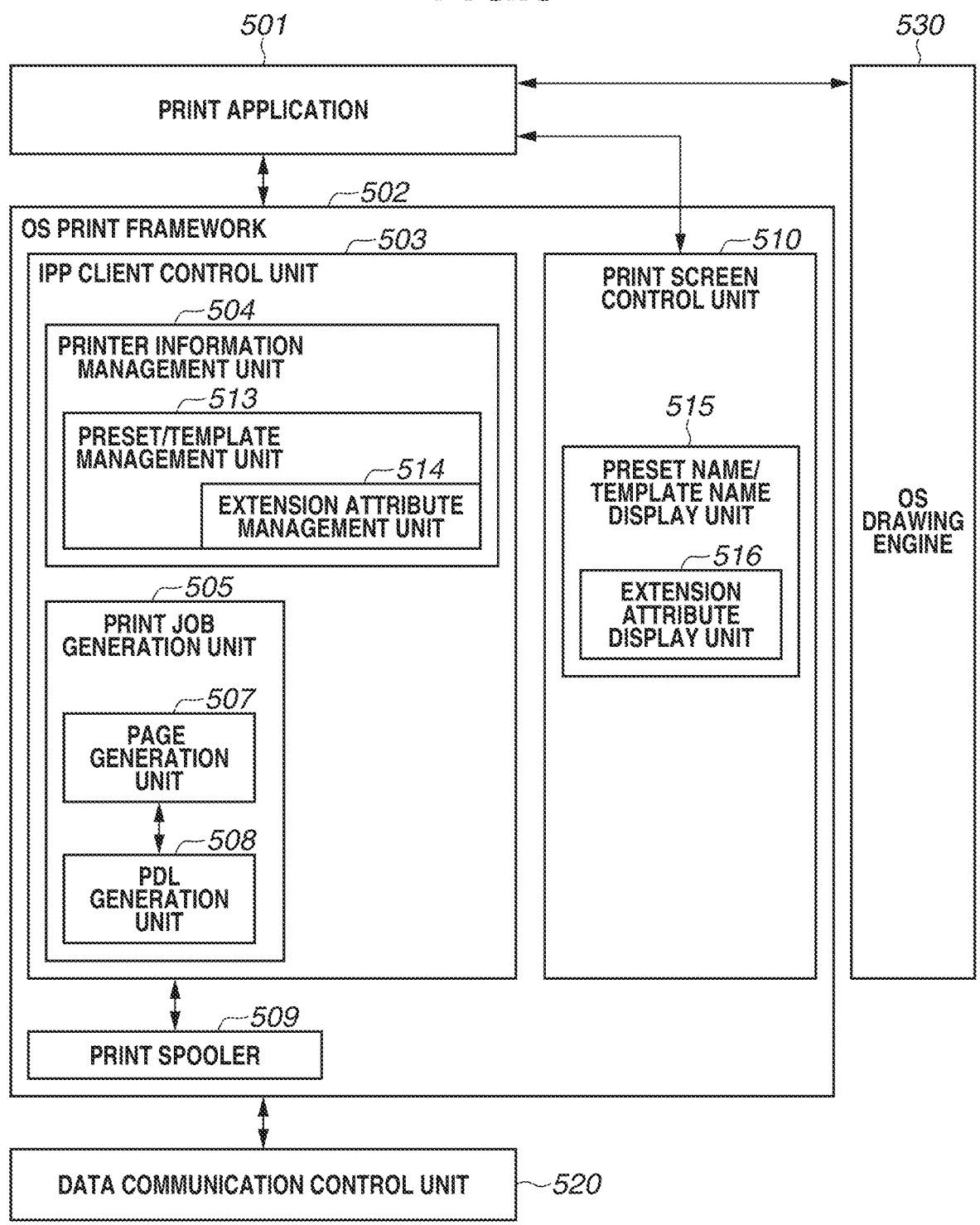
FIG. 5 is a diagram illustrating an example of a software configuration of the information processing apparatus according to the present exemplary embodiment.

FIG. 5 is a diagram illustrating an example of the software configuration of each of the information processing apparatuses 103, 104, and 105. In the present exemplary embodiment, the OS provides a predetermined print service compliant with the IPP.

These functional blocks are achieved by the CPU 311 executing a program loaded into the RAM 312. An application 501 is any application installed on each of the information processing apparatuses by the user and is a general application for a word processor, a spreadsheet, a database, email, or a web browser. An OS print framework 502 includes an IPP client control unit 503, a print spooler 509, and a print screen control unit 510. The IPP client control unit 503 includes a printer information management unit 504 and a print job generation unit 505. The printer information management unit 504 inquires of the image forming apparatus 101 via a data communication control unit 520 and acquires and holds the ability information regarding the image forming apparatus 101.

The printer information management unit 504 acquires, as the ability information regarding the image forming apparatus 101, a list of the names of collective settings such as a preset and a template, and the data types, the ranges, and the initial values as detailed information regarding vendor-specific print settings included in the collective settings.

A preset/template management unit 513 in the printer information management unit 504 holds the list of the names of the collective settings. If the user selects a collective setting including a vendor-specific setting item or setting value, an extension attribute management unit 514 acquires information regarding the attribute name, the data type, and the range of the vendor-specific setting item or setting value from the image forming apparatus. The extension attribute management unit 514 saves the acquired vendor-specific setting item or setting value in the extension attribute management unit 514.

The print screen control unit 510 displays a print screen in response to a call from the application 501. The print screen control unit 510 includes a preset name/template name display unit 515 and displays the names of the collective settings held in the preset/template management unit 513. A collective setting in an IPP-Preset format is a format in which, in response to an inquiry about the ability information from the information processing apparatus, the information processing apparatus is notified of what setting item or setting value is set in the collective setting. A collective setting in the Finishing-Template format is a format in which the information processing apparatus is notified of the name of the collective setting, but is not notified of a set setting item or setting value.

If the user selects a collective setting in which a vendor-specific setting item or setting value is set, the extension attribute management unit 514 inquires of the image forming apparatus about information required to display a screen for setting the vendor-specific setting item included in the name of the selected collective setting in the information processing apparatus. If a vendor-specific setting item or setting value is included in a collective setting, the image forming apparatus notifies the information processing apparatus of information regarding the data type, the range, and the initial value saved in the extension attribute DB 417 of the image forming apparatus as the ability information in association with the name of the collective setting. The information processing apparatus saves in the extension attribute management unit 514 the detailed information regarding the setting item of which the information processing apparatus is notified, and simultaneously displays the setting item as a vendor extension attribute on a print setting screen through an extension attribute display unit 516. The user makes print settings through the print screen and performs printing.

The print screen control unit 510 and the print job generation unit 505 generate a job attribute and a document attribute of an IPP job from setting items on the print screen. The print screen control unit 510 and the print job generation unit 505 acquire a collective setting supported by the image forming apparatus 101 and a print attribute according to the IPP standard of which the setting is changed immediately before printing and a vendor extension attribute in addition to the collective setting, and specify attributes with respect to each job or each page in print data.

If the user selects a collective setting in the Finishing-Template format, the print screen control unit 510 and the print job generation unit 505 notify the information processing apparatus of information regarding a vendor-specific setting item in addition to the setting name of the collective setting. If, on the other hand, the user selects a collective setting in the IPP-Preset format, the print screen control unit 510 and the print job generation unit 505 specify both an IPP standard attribute and a vendor extension attribute included in the collective setting with respect to each job or each page in print data. In the attributes specified at this time, both the IPP standard attribute and the vendor-specific setting item are reflected on the print setting screen. If the user changes setting values obtained by reflecting the values of the IPP standard attribute and the vendor-specific setting item again as the attributes of a print job, the changed values are reflected as they are.

A page generation unit 507 cooperates with a PDL generation unit 508 to convert drawing data generated through an OS drawing engine 530 by the application 501 into PDL data supported by the image forming apparatus 101 and transmit the PDL data to the image forming apparatus 101.

According to a request from the application 501, the OS drawing engine 530 draws print page data in a drawing format according to the OS standard and passes the print page data to the page generation unit 507 of the OS print framework 502. The data communication control unit 520 transmits and receives messages for communication for managing the printer and messages for transmitting a job and managing a job that are generated by the IPP client control unit to and from the image forming apparatus 101.

With reference to FIG. 6, a description is given of a method for registering a preset or a template as a collective setting in the image forming apparatus. FIG. 6 is an example of a screen displayed on the touch panel 318 by accessing the image forming apparatus via the network from any of the information processing apparatus 103, 104, and 105 and logging into the image forming apparatus. Authentication for this login is executed by comparing information regarding a user name and a password input by the user and a user management table 1110 described below with reference to FIG. 11A.

An entry field 601 is a field to which any collective setting name to be assigned to a collective setting to be registered is input. The information processing apparatus is notified of a name input to the entry field 601, and the name is displayed as a collective setting that can be selected on a print setting screen.

Selection checkboxes 602 are checkboxes for setting whether to notify the information processing apparatus of the collective setting to be registered as an IPP-Preset or notify the information processing apparatus of the collective setting to be registered as a Finishing-Template. If the IPP-Preset is selected, the image forming apparatus notifies the information processing apparatus of the name of the collective setting and a set setting item or setting value. If the Finishing-Template is selected, the information processing apparatus is notified of the name of the collective setting.

Selection checkboxes 603 are checkboxes for selecting individual setting items to be included in the collective setting.

A setting item name 609 is the name of a setting item that can be set as the collective setting. The setting item name 609 includes a setting item that is defined by the IPP and can be displayed on a print setting screen provided by the OS without acquiring the name, the data type, and the range of the item from the image forming apparatus. The setting item name 609 also includes the name, the data type, and the range of an item that is not defined by the IPP and is provided by the printing apparatus for display on the print setting screen provided by the OS, such as items 607 and 608. "Opening Style" 607 is the opening direction of an output product when bookbinding printing is performed, and the setting value of the "Opening Style" 607 can be selected from right opening, left opening, top opening, and bottom opening. "Creep Correction" 608 is a setting for adjusting the printing position of an image relative to a sheet when bookbinding printing is performed. The user can set the printing position by the millimeter.

Range selection list/entry fields 604 are areas where the setting values of setting items to be included in the collective setting are selected and input.

Selection checkboxes 605 are checkboxes for selecting whether to permit a change in the setting value of a setting item to be included in the collective setting in job units immediately before printing. If any of the selection checkboxes 605 is selected, the user can select a collective setting to be used in printing in the information processing apparatus and then change the setting value of a setting item included in the selected collective setting.

If a setting item or a setting value set using the checkbox so that a change in the setting item or the setting value immediately before printing is permitted is a vendor-specific setting item or setting value that is not defined by the IPP standard, the image forming apparatus notifies the information processing apparatus of the name, the data type, the range, and the initial value of the setting item. Consequently, even if a print setting included in a collective setting is not a setting item defined by the IPP, the user can change the print setting by operating the information processing apparatus.

An "Add" button 606 is a button for registering a template or a preset as the collective setting in the preset/template DB. If the user selects the "Add" button 606, the settings made on a registration screen 600 are registered in the preset/template DB.

As described above, in the present exemplary embodiment, it is possible to include vendor-specific setting items in a collective setting for treating a plurality of setting items as a single set. Further, it is possible to set whether to permit changes in the settings of these items before printing. Regarding a vendor-specific setting item in which a change before printing is permitted, the image forming apparatus 101 notifies the information processing apparatus 103 of information required to set the vendor-specific setting item. Based on the information provided by the image forming apparatus 101, the information processing apparatus 103 displays a setting screen, whereby the setting of the vendor-specific setting item can be changed in the predetermined print service provided by the OS.

With reference to FIG. 7, a description is given of processing in which the image forming apparatus stores a collective setting in the preset/template DB 416 and stores data in the extension attribute DB 417. The processing illustrated in FIG. 7 is achieved by the CPU 211 controlling the web UI control unit 415 of the image forming apparatus.

The processing illustrated in FIG. 7 is started according to the selection of the "Add" button 606 on the registration screen 600 illustrated in FIG. 6.

In step S711, the web UI control unit 415 extracts the name of a collective setting set in the entry field 601 and setting items selected by the selection checkboxes 603 on the registration screen 600.

In step S712, the web UI control unit 415 determines whether one of the setting items extracted in step S711 is a setting item in which a change in the setting value before printing is permitted. The web UI control unit 415 references the selection checkbox 605 of the setting item and determines whether the checkbox is selected. If the checkbox is selected (YES in step S712), the processing proceeds to step S713. If, on the other hand, the selection checkbox 605 is not selected (NO in step S712), the processing proceeds to step S714.

In step S713, regarding the setting item in which a change in the setting value before printing is permitted according to the determination in step S712, the web UI control unit 415 sets in the extension attribute DB 417 an attribute identifier (ID) indicating the setting item, an initial value indicating the setting value, and a change-immediately-before-printing flag indicating whether to change the setting value before printing. The details of the information stored in the extension attribute DB 417 will be described below with reference to a collective setting management table 1120 and a collective attribute management table 1140 in FIGS. 11A and 11B. In step S713, since a change in the setting value before printing is permitted, the change-immediately-before-printing flag is set to YES.

In step S714, regarding the setting item in which a change in the setting value before printing is not permitted according to the determination in step S712, the web UI control unit 415 sets in the extension attribute DB 417 the attribute ID indicating the setting item, the initial value indicating the setting value, and the change-immediately-before-printing flag indicating whether to change the setting value before printing. The details of the information stored in the extension attribute DB 417 will be described below with reference to the collective setting management table 1120 and the collective attribute management table 1140 in FIGS. 11A and 11B. In step S714, since a change in the setting value before printing is not permitted, the change-immediately-before-printing flag is set to NO.

In step S715, the web UI control unit 415 determines whether the process of step S712 is performed on all the setting items extracted in step S711. If the registration of all the setting items set on the registration screen 600 in the extension attribute DB 417 is completed (YES in step S715), the web UI control unit 415 ends the processing illustrated in FIG. 7. If there is a setting item on which the process is not completed (NO in step S715), the processing returns to step S712. Then, the web UI control unit 415 executes the processes of step S712 and subsequent steps.

By the above processing, it is possible to store a collective setting registered as a preset or a template.

Next, with reference to FIGS. 8A to 8C, a description is given of print settings regarding printing in the image forming apparatus in which a preset or a template is registered. In FIGS. 8A to 8C, FIGS. 8A to 8C are examples of print screens provided by the OS of the information processing apparatus 103, 104, or 105 compatible with two collective setting methods, namely an IPP-Preset (a preset) and a Finishing-Template (a template). The description is given using the information processing apparatus 103 as an example.

A screen 800 is a print setting screen displayed when the user gives an instruction to print data from the application.

A printer selection area 803 is an area for selecting an image forming apparatus to which the information processing apparatus 103 can transmit print data. If an object 804 is selected, a list of image forming apparatuses to be used in printing is displayed, and the user can select an image forming apparatus to be used in printing from the displayed image forming apparatuses. Objects having shapes similar to that of the object 804 illustrated on screens 800, 810, 820, 830, 840, and 850 are a button for displaying a list of options for a corresponding setting item.

A preset selection area 801 is an area for selecting a preset to be used in settings from IPP-Presets registered in the image forming apparatus. If the user selects an object in the preset selection area 801, the screen 820 is displayed. The user selects a preset to be used from a list of the names of IPP-Presets acquired from the image forming apparatus 101. If the user selects a preset, settings corresponding to the selected preset are displayed on the screen 820. For example, if "Sides" corresponding to "com.canon.oip.grp-setting002" registered in the collective setting management table in FIGS. 11A and 11B is selected, the screen 850 is displayed. In this case, settings corresponding to the selected "Sides" are displayed, and "Two-Sided" is set to "Long Edge" corresponding to two-sided printing for left opening. Regarding setting items that are not set in the preset, values set by default are set. In "com.canon.oip.grpsetting002", "Toner Save" for reducing the consumption of toner when printing is performed and a "Store" function for saving print data in the image forming apparatus 101 are set to enabled, and "Box1" is specified as a storage destination. These setting items, however, are not displayed on the screen 850.

If the user selects an option button 851, the screen 840 is displayed. The screen 840 displays settings regarding setting items that cannot be displayed on the screen 850 provided by the OS of the information processing apparatus 103. An area 841 displays the name of the currently selected preset. Areas 842 and 843 are areas displayed based on the attribute IDs, the data types, the initial values, and the ranges acquired from the image forming apparatus 101. The area 842 is an area for setting whether to enable or disable the "Store" function. As the initial value, "ON" set on the registration screen 600 by the user is displayed. If the user selects an object in the area 842, the range of which the information processing apparatus 103 is notified by the image forming apparatus is displayed as an option that can be set, and the user can change the setting before giving a print instruction. The area 843 is an area where the number of a box as a save destination can be set. As the initial value, the value set on the registration screen 600 by the user is displayed. A numerical value 844 is the value of which the information processing apparatus 103 is notified as the range by the image forming apparatus, and is information indicating the range of a numerical value that can be set for the setting item. After completing the settings, the user selects "close" 845. If the "close" 845 is selected, the information processing apparatus 103 displays the screen 850. The user makes other print settings and selects "Print" 852, thereby giving an instruction to execute printing.

Next, a case is described where a template is used. The user selects an option button 802 on the screen 800 without selecting a preset. In the present exemplary embodiment, only either one of a preset and a template can be used. Thus, in a case where a template is used, the option button 802 is selected without selecting a preset in the preset selection area 801, or the option button 802 is selected after cancelling the selection of a preset.

If the user selects the option button 802, the screen 810 is displayed. The screen 810 is a screen for selecting a Finishing-Template to be used. If an object in an area 811 is selected, a list of templates acquired from the image forming apparatus 101 is displayed. The user selects a template to be used in print settings from the displayed list. If the user selects a template, the screen 830 is displayed. To return to the previous screen without selecting a template, the user selects "close" 812.

An area 831 is an area for selecting a template to be used. If the user selects an object in the area 831, a list of the names of templates is displayed, and the user can select a template to be used. In this case, a template is selected in which the name is "Booklet", left opening for bookbinding printing is set, the amount of creep is 0.1 mm, and a setting for permitting a change in the setting before printing is made in each setting item.

An area 832 displays the name and the initial value of a setting item which is included in the template and in which a change in the setting can be made. If the user selects an object in the area 832, the range of which the information processing apparatus 103 is notified by the image forming apparatus 101 is displayed as an option that can be set.

An area 833 displays the name and the initial value of a setting item which is included in the template and in which a change in the setting can be made. The area 833 displays a numerical range registered as the range in the image forming apparatus 101, as a numerical range (0.00 to 10.00) that can be set on the screen 830. If the user selects "close" 834, the screen 800 is displayed. The user makes other print settings and then selects "Print" 805, thereby giving an instruction to execute printing. A setting item included in the template and defined by the IPP is not displayed on a print setting screen of the information processing apparatus 103, and a change in the setting before printing is not permitted, either.

This is an overview of an operation until the user gives an instruction to execute printing using a preset or a template by operating the information processing apparatus 103.

Figure 9A:
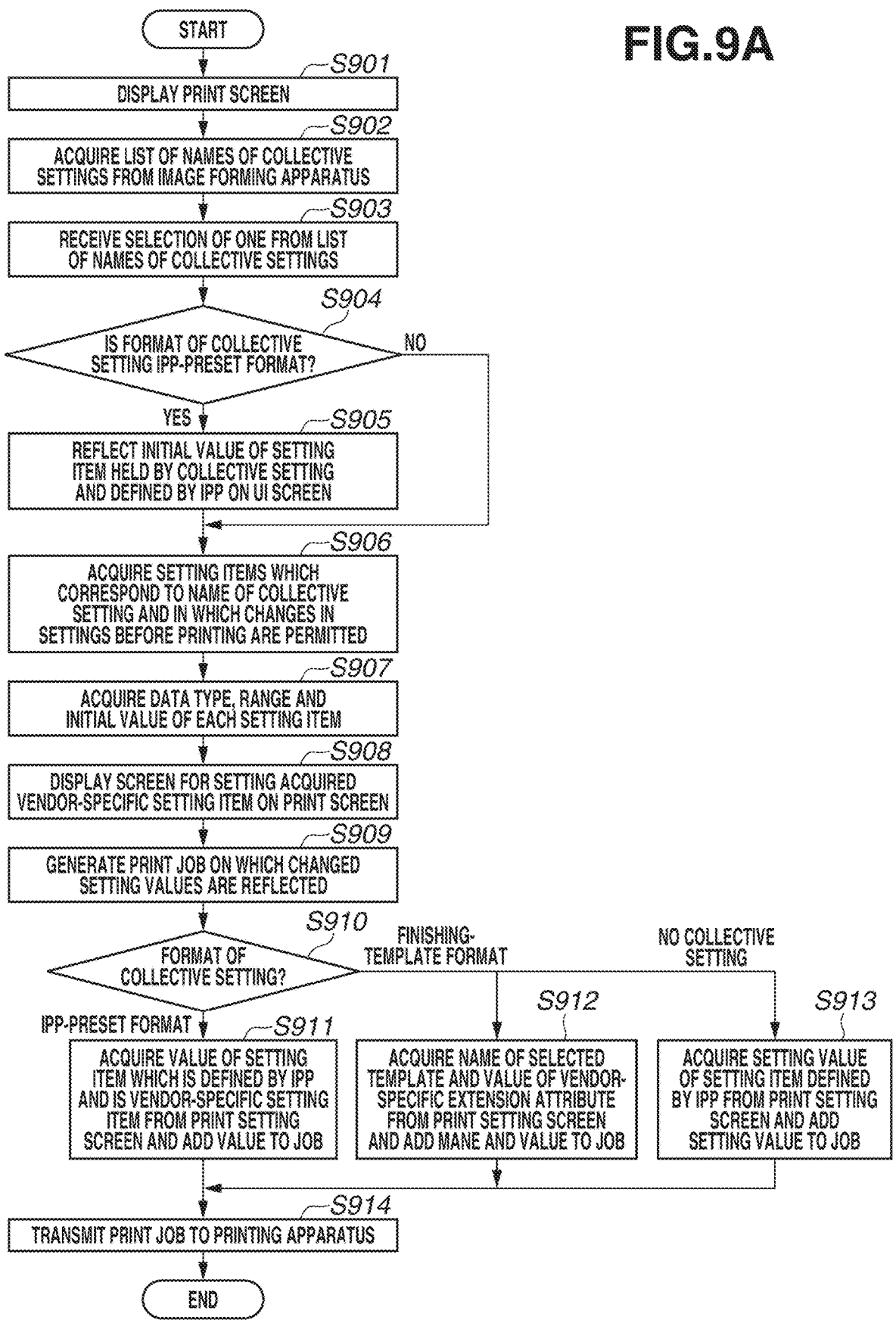
FIG. 9A is a flowchart illustrating a vendor extension attribute acquisition process according to the present exemplary embodiment.

Next, with reference to FIGS. 9A and 9B, a description is given of processing from the making of print settings in the information processing apparatus 103 to the giving of a print instruction. The processing illustrated in FIG. 9A is achieved by the CPU 311 controlling the software modules illustrated in FIG. 5.

In step S901, the print screen control unit 510 receives an instruction to open the print setting screen 800 from the application on the information processing apparatus and displays the screen illustrated as the screen 800.

In step S902, the print screen control unit 510 controls the IPP client control unit 503 to acquire information regarding collective settings registered in the collective setting management table 1120 stored in the preset/template DB 416 from the IPP server control unit 401 of the image forming apparatus. The print screen control unit 510 notifies the image forming apparatus 101 of a user ID of a user logging into the information processing apparatus 103 and acquires the names of collective settings corresponding to the user ID. At this time, regarding a collective setting set as an IPP-Preset, the name of a preset and the name and the initial value of a setting item associated with the preset and defined by the IPP are acquired. Regarding a collective setting set as a Finishing-Template, only the name of a template is acquired.

In step S903, the print screen control unit 510 receives the selection of a collective setting to be used in print settings from the user. The print screen control unit 510 displays the screen 810 or the screen 820 and receives the selection of a collective setting. The received collective setting may be an IPP-Preset or may be a Finishing-Template.

In step S904, the print screen control unit 510 determines whether the selected collective setting is a collective setting in the IPP-Preset format. The information regarding the collective settings acquired in step S902 includes whether each collective setting is a collective setting in the IPP-Preset format or a collective setting in the Finishing-Template format. The print screen control unit 510 references the information and determines whether the selected collective setting is a collective setting in the IPP-Preset format. If the selected collective setting is a collective setting in the IPP-Preset format (YES in step S904), the processing proceeds to step S905. If the selected collective setting is not a collective setting in the IPP-Preset format (NO in step S904), the selected collective setting is a collective setting in the Finishing-Template format. Thus, the processing proceeds to step S906.

In step S905, the print screen control unit 510 reflects the initial value of a setting item included in the information regarding the collective settings acquired in step S902 and defined by the IPP on a print setting screen provided by the OS and displays the screen 850. Regarding a setting item that corresponds to the selected collective setting and can be set on the print setting screen 800 displayed by the OS, even if a setting for permitting a change in the setting before printing is not made on the registration screen 600, the setting item is displayed so that a change in the setting can be made.

In step S906, the extension attribute display unit 516 transmits to the image forming apparatus 101 an acquisition request to acquire the names of setting items that correspond to the collective setting selected in step S903 and are vendor-specific setting items in which changes in the settings before printing are permitted. The result of the acquisition is stored in the extension attribute management unit 514.

In step S907, the extension attribute display unit 516 acquires information regarding the data type, the initial value, and the range of each of the setting items acquired in step S906 from the image forming apparatus 101. Similarly, the result of the acquisition is stored in the extension attribute management unit 514.

In step S908, the extension attribute display unit 516 displays a screen (e.g., the screen 830 or the screen 840) where the setting value of a vendor-specific setting item that is indicated on the screen 810 or 820 and corresponds to the selected collective setting can be input. This screen displays the setting value set on the registration screen 600 as the initial value. Regarding a setting item of which the setting value is selected from a plurality of options, an instruction to change the setting is received from the user, a list of options is displayed, and the setting is changed to an option selected by the user. Regarding a setting item of which the setting value is input, values and character types that can be input are displayed, and the input of a number or a character as the setting value is received from the user.

In step S909, the print job generation unit 505 receives a print instruction from the user and generates a print job. If print settings are changed on the screen 800, 820, 830, or 840, the print job generation unit 505 generates the print job based on the changed setting values.

In step S910, the PDL generation unit 508 determines whether a collective setting is set in the print settings. If a collective setting is set, the PDL generation unit 508 determines which of the IPP-Preset format and the Finishing-Template format the format of the selected collective setting is. If the set collective setting is a collective setting in the IPP-Preset format, the processing proceeds to step S911. If the set collective setting is a collective setting in the Finishing-Template format, the processing proceeds to step S912. If no collective setting is set, the processing proceeds to step S913.

In step S911, regarding a setting item corresponding to a selected preset, the PDL generation unit 508 acquires the setting value set on the screen 850 or 840 from the print screen control unit 510 and adds the setting value to the print job. At this time, regarding a setting item that corresponds to the selected preset and is a vendor-specific setting item in which a change in the setting before printing is not permitted, the value of which the information processing apparatus 103 is notified by the image forming apparatus 101 is added to the print job even if the setting item is not displayed on the screen. Regarding a setting item of which the setting is not changed by the user, the value of the setting item is added to the print job. In a case where a preset is used, the name of the preset may not be added to the print job.

In step S912, the PDL generation unit 508 adds the name of a selected template and the setting value and the name of a vendor-specific setting item to the print job. Regarding a vendor-specific setting item in which a setting for permitting the setting before printing is made on the registration screen 600, the attribute value and the setting value of the item are added to the print job. Regarding a setting item displayed on the print setting screen provided by the OS, the value set on the print setting screen is added to the print job.

In step S913, the PDL generation unit 508 acquires the setting value of a setting item defined by the IPP immediately before printing from the print screen control unit 510 and adds the setting value to the job.

In step S914, the print job generation unit 505 transmits the generated print job to the printing apparatus via the print spooler 509. Based on the above, the information processing apparatus 103 can transmit a print job having print settings made using a collective setting to the image forming apparatus 101.

Next, with reference to FIG. 9B, a description is given of the processing of the image forming apparatus 101 while the information processing apparatus 103 displays the print setting screens and generates a print job. The processing illustrated in FIG. 9B is achieved by the CPU 211 controlling the modules illustrated in FIG. 4.

In step S921, the printer ability notification unit 402 determines whether an acquisition request to acquire a collective setting is received from the information processing apparatus 103. If an acquisition request to acquire a collective setting is not received (NO in step S921), the printer ability notification unit 402 repeatedly performs the process of step S921.

If an acquisition request to acquire a collective setting is received (YES in step S921), the printer ability notification unit 402 executes the process described in step S922. The printer ability notification unit 402 references the preset/template DB 416 and extracts a collective setting key 1125 of each of collective settings which are registered in the collective setting management table 1120 described below with reference to FIG. 11A and of which a type 1124 is "preset". Further, regarding setting items which are set in the extracted collective setting and of which an extension attribute 1133 of in a collective attribute master table 1130 is "NO", the printer ability notification unit 402 references the collective attribute management table 1140 and acquires the initial values. Then, the printer ability notification unit 402 notifies the information processing apparatus 103 of the extracted collective setting key and the initial values of the setting items defined by the IPP.

In step S923, the printer ability notification unit 402 references the preset/template DB 416 and extracts the collective setting key 1125 of each of collective settings which are registered in the collective setting management table 1120 in FIG. 11A and of which the type 1124 is "fin-template". Then, the printer ability notification unit 402 notifies the information processing apparatus 103 of the extracted collective setting key.

In step S924, the printer ability notification unit 402 determines whether the collective setting key of a collective setting selected on a print setting screen is received from the information processing apparatus 103. If the collective setting key is not received (NO in step S924), the processing proceeds to step S928.

If the collective setting key is received (YES in step S924), then in step S925, the printer ability notification unit 402 determines whether the selected collective setting includes a setting item which is a vendor-specific setting item and in which a change before printing is permitted. The printer ability notification unit 402 references the collective attribute management table 1140 and the collective attribute master table. The printer ability notification unit 402 determines whether there is a setting item which has an attribute ID corresponding to the collective setting key of which the image forming apparatus 101 is notified by the information processing apparatus 103 in step S924 and of which a change immediately before printing 1143 is YES and the extension attribute 1133 is YES. If there is not a setting item which corresponds to the collective setting of which the image forming apparatus 101 is notified, and which is a vendor-specific setting item, and in which a change in the setting before printing is permitted (NO in step S925), the processing proceeds to step S928. If there is a setting item which corresponds to the collective setting of which the image forming apparatus 101 is notified, and which is a vendor-specific setting item, and in which a change in the setting before printing is permitted (YES in in step S925), the processing proceeds to step S926.

In step S926, the printer ability notification unit 402 notifies the information processing apparatus 103 of the name of the setting item which is the vendor-specific setting item corresponding to the selected collective setting and in which a change in the setting immediately before printing is permitted. The printer ability notification unit 402 notifies the information processing apparatus 103 of an attribute key 1132 of the setting item which is the vendor-specific setting item corresponding to the selected collective setting and in which a change in the setting immediately before printing is permitted.

In step S927, the printer ability notification unit 402 notifies the information processing apparatus 103 of the data type, the range, and the initial value regarding the vendor-specific setting item of which the information processing apparatus 103 is notified in step S926. The printer ability notification unit 402 references the collective attribute master table 1130 and notifies the information processing apparatus 103 of a data type 1134 and a range 1135 of the attribute key 1132 corresponding to the setting item of which the information processing apparatus 103 is notified in step S926. Further, the printer ability notification unit 402 references the collective attribute management table 1140 and notifies the information processing apparatus 103 of a collective setting ID of the currently selected collective setting and an initial value 1144 corresponding to a setting ID of which the information processing apparatus 103 is notified in step S926.

In step S928, the print job generation unit 404 determines whether a print job is received from the information processing apparatus 103. If the print job generation unit 404 does not receive a print job (NO in step S928), the processing returns to step S924. If a print job is received (YES in step S928), the processing proceeds to step S929.

In step S929, the print job generation unit 404 determines whether the received print job includes the name of a Finishing-Template for identifying a Finishing-Template. If the received print job does not include the name of a Finishing-Template (NO in step S929), the processing proceeds to step S931.

If the received print job includes the name of a Finishing-Template (YES in step S929), the print job generation unit 404 reads the Finishing-Template having the received name from the preset/template DB 416 and applies the Finishing-Template to the print job. At this time, regarding an item which is a vendor-specific setting item corresponding to the Finishing-Template and in which a change in the setting before printing is permitted, the value set in the received print job is set. On the other hand, regarding a setting item which is a vendor-specific setting item corresponding to the Finishing-Template and in which a change in the setting before printing is not permitted, the setting value stored in the preset/template DB 416 is set in the print job. In this manner, it is possible to permit changes in the settings of some of setting items that are collectively set as a template and are vendor-specific setting items on a print setting screen, and prohibit changes in the settings of some of the items on the print setting screen.

In step S931, based on the print job received from the information processing apparatus 103 or the print job to which the settings are added in step S930, the print job generation unit 404 executes printing.

Based on the above, the image forming apparatus 101 can execute printing using a collective setting. In the present exemplary embodiment, the image forming apparatus transmits information required to change the setting of only a vendor-specific setting item set as the collective setting to the information processing apparatus. Information provided to the information processing apparatus by the image forming apparatus is thus limited, whereby it is possible to reduce information required to display a screen for changing the setting of the vendor-specific setting item and quickly display the screen for changing the vendor-specific setting item.

Figure 10A:
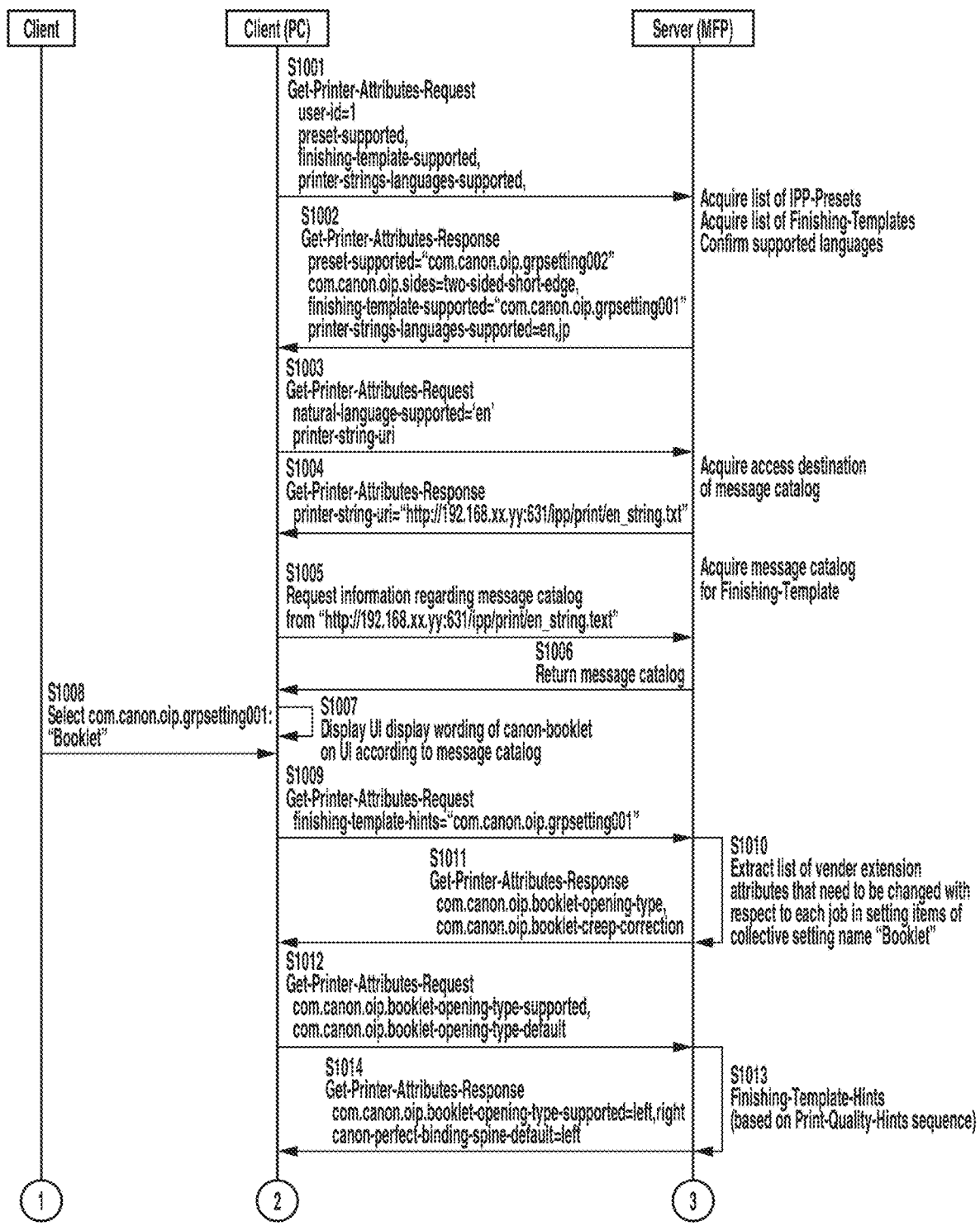
FIGS. 10A and 10B are a sequence diagram illustrating a process of acquiring and setting extension attributes accompanying a template and a preset according to the present exemplary embodiment.
Figure 10B:
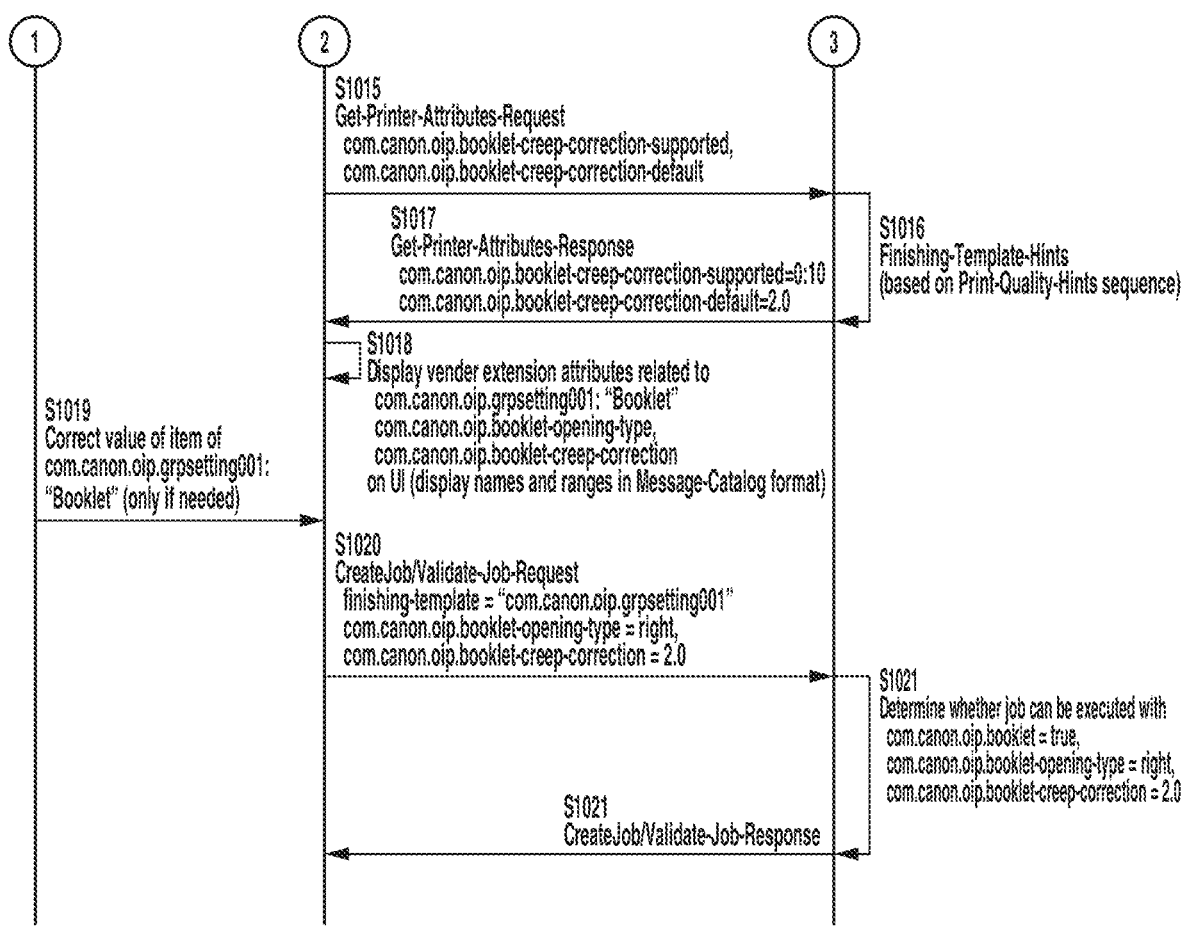

FIGS. 10A and 10B are a sequence diagram illustrating processing between the image forming apparatus 101 and the information processing apparatus 103 when the print setting screens illustrated in FIGS. 8A to 8C are displayed.

In step S1001, the printer information management unit 504 inquires of the printer ability notification unit 402 of the image forming apparatus about whether a collective setting in the IPP-Preset format is supported and whether a collective setting in the Finishing-Template format is supported. The printer information management unit 504 further inquires of the image forming apparatus 101 about languages supported by the Message-Catalog format. At this time, the information processing apparatus 103 notifies the image forming apparatus of identification information regarding a user logging into the information processing apparatus.

In step S1002, the printer ability notification unit 402 references the collective setting management table 1120 and returns to the image forming apparatus 101 the setting key of a collective setting corresponding to the user ID of which the printer ability notification unit 402 is notified by the image forming apparatus. The printer ability notification unit 402 notifies the information processing apparatus 103 of "com.canon.oip.grpsetting002" registered as an IPP-Preset and the setting of two-sided printing with a binding margin on the short edge side as a setting item defined by the IPP. The printer ability notification unit 402 does not notify the information processing apparatus 103 of a vendor-specific item of which the extension attribute 1133 is YES among settings associated with "com.canon.oip.grpsetting002". Further, the printer ability notification unit 402 notifies the information processing apparatus 103 that "com.canon.oip.grpsetting001" is registered as a Finishing-Template. Regarding the Finishing-Template, the printer ability notification unit 402 does not notify the information processing apparatus 103 of a setting item and a setting value, regardless of whether the extension attribute 1133 is YES or NO. The printer ability notification unit 402 also notifies the information processing apparatus 103 of language information indicating that "English" and "Japanese" are supported by the Message-Catalog format.

In step S1003, the printer information management unit 504 of the information processing apparatus 103 notifies the image forming apparatus 101 of which of the supported languages according to the notification the display is to be performed in. The printer information management unit 504 notifies the image forming apparatus 101 that the display is to be performed in English (en). Based on the received information regarding the language display, the image forming apparatus 101 identifies a Uniform Resource Identifier (URI) for acquiring a message catalog of which the information processing apparatus 103 is to be notified. The message catalog refers to text information used when the information processing apparatus 103 displays attribute information of which the information processing apparatus 103 is notified by the image forming apparatus 101. The message catalog is, for example, a table illustrated as a message catalog table 1150 in FIG. 11B.

In step S1004, the printer ability notification unit 402 of the image forming apparatus 101 notifies the information processing apparatus 103 of the Uniform Resource Locator (URL) for acquiring the message catalog table.

In step S1005, the print screen control unit 510 accesses the URI of which the information processing apparatus 103 is notified in step S1004. Then, the print screen control unit 510 transmits an acquisition request to acquire a message catalog supporting English from the printing apparatus.

The printer ability notification unit 402 of the image forming apparatus 101 returns the message catalog table 1150 in FIG. 11B to the information processing apparatus 103.

In step S1007, according to the acquired message catalog, the print screen control unit 510 of the information processing apparatus displays a print setting screen. Consequently, the print screen control unit 510 can display "com.canon.oip.grpsetting001" as "Booklet". Further, the information processing apparatus 103 can display "com.canon.oip.grpsetting002" of which the information processing apparatus 103 is notified by the image forming apparatus 101, as "Sides".

A description is given using as an example a case where the user makes print settings using a Finishing-Template.

In step S1008, the user selects a collective setting: "Booklet" in the Finishing-Template format in the area 811 on the screen 810.

In step S1009, the printer information management unit 504 of the information processing apparatus transmits to the image forming apparatus 101 an acquisition request to acquire information regarding a vendor-specific setting item corresponding to the collective setting key "com.canon.oip.grpsetting001".

The printer ability notification unit 402 of the printing apparatus extracts setting items which are vendor-specific setting items corresponding to "com.canon.oip.grpsetting001" and in which changes in the settings before printing are permitted. The vendor-specific setting items corresponding to "com.canon.oip.grpsetting001" are identified in the collective attribute management table in FIGS. 11A and 11B. In this case, "com.canon.oip.Booklet", "com.canon.oip.Booklet-opening-type", and "com.canon.oip.Booklet-creep-correction" are identified. Among these vendor-specific setting items, a change in the setting before printing is not permitted in "com.canon.oip.Booklet". Thus, the information processing apparatus 103 is not notified of "com.canon.oip.Booklet".

In step S1011, the printer ability notification unit 402 notifies the information processing apparatus 103 of "com.canon.oip.Booklet-opening-type" and "com.canon.oip.Booklet-creep-correction".

In step S1012, the printer information management unit 504 of the information processing apparatus 103 receives a request from the extension attribute display unit 516 and requests the data type, the range, and the initial value of "com.canon.oip.Booklet-opening-type" from the printing apparatus.

In step S1013, the printer ability notification unit 402 references the collective attribute master table 1130 and extracts the data type 1134 and the range 1135 corresponding to "com.canon.oip.Booklet-opening-type". Then, in step S1014, the printer ability notification unit 402 notifies the information processing apparatus 103 of the data type, the range, and the initial value.

In step S1015, the printer information management unit 504 of the information processing apparatus 103 receives a request from the extension attribute display unit 516 and requests the data type, the range, and the initial value of "com.canon.oip.Booklet-creep-correction" from the printing apparatus.

In step S1016, the printer ability notification unit 402 references the collective attribute master table 1130 and extracts the data type 1134 and the range 1135 corresponding to "com.canon.oip.Booklet creep-correction". Then, in step S1017, the printer ability notification unit 402 notifies the information processing apparatus 103 of the data type, the range, and the initial value.

In step S1018, the print screen control unit 510 and the extension attribute display unit 516 of the information processing apparatus read the message catalog again and display a print setting screen for the vendor-specific setting items. "com.canon.oip.Booklet-opening-type" is displayed as "Opening Type". "com.canon.oip.Booklet-creep-correction" is displayed as "Creep Correction". Similarly, the ranges and the initial values are also reflected on a list menu from the message catalog.

In step S1019, the user corrects the value of a vendor extension attribute included in the collective setting: "Booklet" where necessary. For example, the user changes the opening direction of "Booklet" to "Right" and corrects "Creep Correction" to 2.0 mm.

In step S1020, the print job generation unit 505 generates a print job including the setting values set on the print setting screens and transmits the print job to the image forming apparatus 101 via the print spooler 509. The print job notifies the image forming apparatus 101 of the collective setting key of the Finishing-Template that is used and the changed setting values.

Regarding a setting item which corresponds to the Finishing-Template of which the print job generation unit 404 of the image forming apparatus 101 is notified, and in which a change in the setting before printing is not permitted, the print job generation unit 404 of the image forming apparatus 101 references the collective attribute management table 1140 and adds the setting of the setting item to the received print job. In this case, "com.canon.oip.Booklet=true" is a print setting to be added. After the print setting is added, the image forming apparatus 101 executes processing required for printing and notifies the information processing apparatus 103 of the result of the processing.

A case where an IPP-Preset is used as a collective setting and a case where a Finishing-Template is used as a collective setting are different from each other in processing when an IPP-Preset to be used is selected in step S1008. If an IPP-Preset is selected, the setting value and the setting item of which the information processing apparatus 103 is notified in step S1002 are reflected on a print setting screen. Thus, in an IPP-Preset, the setting of also an IPP attribute can be changed before printing.

Finally, with reference to FIGS. 11A and 11B, tables managed in the preset/template DB 416 of the image forming apparatus 101 are described. Tables illustrated in FIGS. 11A and 11B are saved on the storage 214 of the image forming apparatus, the CPU 211 loads table information regarding the tables in the storage into the RAM 213, updates the table information, and reflects the table information on data saved in the storage.

A user management table 1110 is described. This management table includes a user ID 1111 for uniquely identifying a user, and a password 1112 and a user name 1113 of the user with respect to each record. As the user ID, a unique ID is automatically assigned to identify the registerer of each collective setting in a collective setting management table. The web UI control unit 415 can access the collective setting registration screen 600 only if the user name 1113 and the password 1112 match input information. The user ID is also used to manage a user having registered a collective setting.

The collective setting management table 1120 is a table for managing a collective setting such as a template or a preset. A registerer ID 1121 is information indicating which user a user having made a collective setting through the registration screen 600 is. A collective setting ID is information for identifying the collective setting registered through the registration screen 600 and is an ID shared and used among the plurality of tables illustrated in FIGS. 11A and 11B. A type 1124 is information indicating whether the registered collective setting is an IPP-Preset or a Finishing-Template. "Fin-template" indicates a Finishing-Template. "Preset" indicates an IPP-Preset. A collective setting name 1123 is the name of the collective setting input through the registration screen 600. This name is also registered in a message catalog table 1150 described below. A collective setting key 1125 is a character string for identifying the collective setting and is one of pieces of identification information for identifying the collective setting.

A collective attribute master table 1130 is a table illustrating the name, the data type, and the range of a setting item defined by the IPP or a vendor-specific setting item.

An attribute ID 1131 is identification information specific to a setting item. The attribute ID is used in common among the tables illustrated in FIGS. 11A and 11B. An attribute key 1132 is a character string representing a setting item that is used when the image forming apparatus 101 notifies the information processing apparatus 103 of the ability information. An extension attribute 1133 is information indicating whether each setting item is a setting item defined by the IPP or a vendor-specific setting item. "YES" indicates that the setting item is a vendor-specific setting item. On the other hand, "NO" indicates that the item is a setting item defined by the IPP. A data type 1134 indicates the data type when the setting item is set. "Boolean" indicates that the setting item takes either of "true" and "false". "Integer" indicates that the setting item can take an integer value. "Type2 Keyword" and "Type3 Keyword" indicate that a range is represented based on a format defined by the IPP.

A collective attribute management table 1140 indicates which setting item is set with what initial value regarding each of the collective settings registered in the collective setting management table 1120. Since a single collective setting includes one or more attributes, the printer ability notification unit 402 acquires records in a plurality of rows to acquire information regarding a single collective setting.

A collective setting ID 1141 is a common ID with the collective setting ID 1122 of the collective setting management table and indicates to which of the collective settings the setting of a row is related. An attribute ID 1142 is a common ID with the attribute ID 1131 of the collective attribute master table 1130 and is information indicating which setting item is set. A change immediately before printing 1143 indicates whether a change in the setting value of the setting item is permitted after the collective setting is reflected. If the selection checkbox 605 on the registration screen 600 is checked and a change before printing is permitted, "YES" is set. If the selection checkbox 605 on the registration screen 600 is not checked and a change in the setting before printing is not permitted, "NO" is set. An initial value 1144 is an initial value when the collective setting is displayed on a print setting screen. In the initial value 1144, the value set in the range selection list/entry field 604 on the registration screen 600 is stored.

The preset/template DB 416 of the image forming apparatus receives an inquiry about an individual vendor extension attribute associated with a collective setting from the information processing apparatus and references the tables illustrated in FIGS. 11A and 11B. The image forming apparatus links the attribute ID 1131 of the collective attribute master table 1130 and the attribute ID 1142 of the collective attribute management table 1140 as a main key and links the collective setting ID 1122 of the collective setting management table 1120 and the collective setting ID 1141 of the collective attribute management table 1140 as a main key. Then, the image forming apparatus searches for attribute information corresponding to a collective setting ID of a table obtained by linking the three tables.

The message catalog table 1150 is a table for converting the collective setting key 1125, the attribute key 1132, and the range 1135 in the tables illustrated in FIG. 11A into character strings to be displayed on a print setting screen. This table is created with respect to each supported language. The message catalog table 1150 is a table acquired when the information processing apparatus 103 displays a print setting screen. This table may be managed at a location different from that of the image forming apparatus 101.

Based on the above description, information regarding vendor extension attributes is associated with the name of a collective setting and is limited to attributes that need to be changed with respect to each job, whereby the notification of the ability between the printing apparatus and the information processing apparatus is the transmission and reception of minimum necessary vendor extension attributes. This can reduce the amount of data from the printing apparatus to the information processing apparatus. Then, the transmission and reception are performed at the timing when the collective setting is applied in printing, whereby it is possible to reset only vendor extension attributes that need to be changed in job units without editing and registering the collective setting registered in advance itself again.

Other Exemplary Embodiments

In the present exemplary embodiment, in step S1001 in FIG. 10A, identification information regarding a user logging into the information processing apparatus 103 is transmitted to the image forming apparatus 101, and a collective setting corresponding to the user ID of the user is acquired. In step S1001, the identification information regarding the user may not be transmitted, and information regarding all collective settings registered in the image forming apparatus 101 may be transmitted to the information processing apparatus 103.

In the present exemplary embodiment, after a collective setting to be used is selected by the user, the attribute key, the data type, the range, and the initial value of a vendor-specific setting item corresponding to the selected collective setting are transmitted to the information processing apparatus 103. In step S1002 in FIG. 10A, the attribute keys, the data types, the ranges, and the initial values of vendor-specific setting items corresponding to collective settings registered in the image forming apparatus may be transmitted to the information processing apparatus 103.

In the present exemplary embodiment, on the registration screen 600 illustrated in FIG. 6, it is possible to set whether to permit a change in the setting before printing regarding any setting item. According to "Type" selected by the user, the setting of whether to permit a change in the setting may be prohibited. For example, if the user chooses to use a Finishing-Template, setting items defined by the IPP, such as "Number of Copies" and "2-sided Printing", cannot be changed on a print setting screen displayed on the information processing apparatus 103. Accordingly, if a Finishing-Template is selected as "Type" 602, "Change by job" corresponding to an item defined by the IPP may be grayed out and prohibited from being set. In this case, "NO" is set in the change immediately before printing 1143 of the collective attribute management table 1140. In an IPP-Preset, a change in the setting before printing is permitted regarding an item defined by the IPP. Accordingly, if an IPP-Preset is selected as the "Type" 602, "Change by job" corresponding to an item defined by the IPP may be grayed out and prohibited from being set. In this case, "YES" is set in the change immediately before printing 1143 of the collective attribute management table 1140.

The present invention can be achieved also by performing the following process. This is the process of supplying software (a program) for achieving the functions of the above exemplary embodiments to a system or an apparatus via a network or various storage media, and of causing a computer (or a CPU or a microprocessor unit (MPU)) of the system or the apparatus to read and execute a program code. In this case, the computer program and a storage medium that stores the computer program constitute the present invention.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Based on an image forming apparatus according to the present invention, when information regarding a set of print settings registered in the image forming apparatus is displayed on a print setting screen provided by a predetermined print service, the image forming apparatus can also display a vendor-specific setting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
one or more processors; and
at least one memory storing executable instructions, which when executed by the one or more processors, cause the image forming apparatus to perform operations comprising:
registering setting values of a plurality of setting items including a predetermined setting item and a single identifier in association with each other, the registering including registering a first setting value of the predetermined setting item in association with the single identifier;
transmitting, to an information processing apparatus, the single identifier registered in the registering;
receiving print data from the information processing apparatus having received the single identifier transmitted in the transmitting;
executing processing based on the received print data, wherein the information processing apparatus displays a print setting screen where the single identifier received from the image forming apparatus can be selected but is not selected and where the first setting value of the predetermined setting item cannot be set, and based on selection of the single identifier on the print setting screen, the information processing apparatus displays a print setting screen where the first setting value of the predetermined setting item can be set; and
transmitting, to the information processing apparatus, information indicating a second setting value that can be set for the predetermined setting item and can be set instead of the first setting value of the predetermined setting item registered in association with the single identifier, wherein the information indicating the second setting value that can be set for the predetermined setting item and can be set instead of the first setting value of the predetermined setting item registered in association with the single identifier includes location information for acquiring text information to be displayed in an area for setting the predetermined setting item.

2. The image forming apparatus according to claim 1, wherein based on a state where information indicating the single identifier associated with the first setting value of the predetermined setting item is received from the information processing apparatus, the information indicating the second setting value that can be set for the predetermined setting item and can be set instead of the first setting value of the predetermined setting item registered in association with the single identifier is transmitted to the information processing apparatus.

3. The image forming apparatus according to claim 2,
wherein the single identifier is one of a plurality of identifiers registered by the image forming apparatus and transmitted to the information processing apparatus, and
wherein the single identifier is received from the information processing apparatus based on a user instruction on a screen displayed by the information processing apparatus selecting the single identifier among the transmitted plurality of identifiers.

4. The image forming apparatus according to claim 2, wherein the executable instructions, when executed by the one or more processors, further cause the image forming apparatus to perform operations comprising:
registering setting values of a plurality of setting items that does not include the predetermined setting item and another single identifier in association with each other, and
wherein in a case where information indicating the another single identifier is received from the information processing apparatus, the information indicating the second setting value that can be set for the predetermined setting item is not transmitted to the information processing apparatus.

5. The image forming apparatus according to claim 1, wherein the information indicating the second setting value that can be set for the predetermined setting item and can be set instead of the first setting value of the predetermined setting item registered in association with the single identifier includes at least one of a data type, a range, and an initial value of the predetermined setting item.

6. The image forming apparatus according to claim 1, wherein the location information is a Uniform Resource Locator (URL) used to acquire the text information including a character string to be displayed in the area for setting the predetermined setting item.

7. The image forming apparatus according to claim 1, wherein the single identifier is an identifier set by a user.

8. The image forming apparatus according to claim 1, wherein the executable instructions, when executed by the one or more processors, further cause the image forming apparatus to perform operations comprising:
receiving a request to acquire information regarding the registered single identifier from the information processing apparatus; and
in accordance with the request, transmitting the registered single identifier and the setting values registered in association with the single identifier to the information processing apparatus.

9. The image forming apparatus according to claim 1, wherein the plurality of setting items includes a setting value of a setting item that can be set even in a state where the single identifier registered in association with the first setting value of the predetermined setting item is not selected in the information processing apparatus.

10. The image forming apparatus according to claim 1, wherein the print data received in the receiving includes the second setting value of the predetermined setting item after the first setting value of the predetermined setting item transmitted from the image forming apparatus is changed according to an instruction received from a user by the information processing apparatus.

11. The image forming apparatus according to claim 10, wherein processes the received print data is processed based on the second setting value of the predetermined setting item after the first setting value of the predetermined setting item is changed according to the instruction.

12. The image forming apparatus according to claim 1, wherein the single identifier is transmitted to the information processing apparatus in compliance with the Internet Printing Protocol.

13. A control method for controlling an image forming apparatus, the control method comprising:
registering setting values of a plurality of setting items including a predetermined setting item and a single identifier in association with each other, the registering including registering a first setting value of the predetermined setting item in association with the single identifier;
transmitting, to an information processing apparatus, the single identifier registered in the registering;
receiving print data from the information processing apparatus having received the single identifier transmitted in the transmitting;
executing processing based on the received print data,
wherein the information processing apparatus displays a print setting screen where the single identifier received from the image forming apparatus can be selected but is not selected and where the first setting value of the predetermined setting item cannot be set, and based on selection of the single identifier on the print setting screen, the information processing apparatus displays a print setting screen where the first setting value of the predetermined setting item can be set; and
transmitting, to the information processing apparatus, information indicating a second setting value that can be set for the predetermined setting item and can be set instead of the first setting value of the predetermined setting item registered in association with the single identifier, wherein the information indicating the second setting value that can be set for the predetermined setting item and can be set instead of the first setting value of the predetermined setting item registered in association with the single identifier includes location information for acquiring text information to be displayed in an area for setting the predetermined setting item.

* * * * *